(12) United States Patent
Horn et al.

(10) Patent No.: US 12,231,912 B2
(45) Date of Patent: Feb. 18, 2025

(54) SYSTEM AND METHOD FOR REPORTING ORBITAL ANGULAR MOMENTUM WAVEFORM MISALIGNMENT

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL); Yehonatan Dallal, Kfar Saba (IL); Ran Berliner, Kfar-Aviv (IL); Amit Bar-Or Tillinger, Tel-Aviv (IL); Danlu Zhang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/351,819

(22) Filed: Jun. 18, 2021

(65) Prior Publication Data

US 2022/0408274 A1  Dec. 22, 2022

(51) Int. Cl.
*H04W 16/28* (2009.01)
*H04W 24/08* (2009.01)
*H04W 72/21* (2023.01)

(52) U.S. Cl.
CPC ........... *H04W 16/28* (2013.01); *H04W 24/08* (2013.01); *H04W 72/21* (2023.01)

(58) Field of Classification Search
CPC ..... H04W 16/28; H04B 7/043; H04B 7/0016; H04B 7/0617; H04B 17/309; H04B 17/043; H04B 17/0016
See application file for complete search history.

(56) References Cited

U.S. PATENT DOCUMENTS

| 8,432,884 B1 | 4/2013 | Ashrafi |
| 8,743,984 B2 | 6/2014 | Djordjevic et al. |

(Continued)

FOREIGN PATENT DOCUMENTS

| CN | 110266354 A | 9/2019 |
| EP | 3567783 A1 | 11/2019 |

(Continued)

OTHER PUBLICATIONS

Vasnetsov M.V., et al., "Analysis of Orbital Angular Momentum of a Misaligned Optical Beam", New Journal of Physics, vol. 7, No. 46, 2005, pp. 1-17.

(Continued)

*Primary Examiner* — Bo Hui A Zhu
(74) *Attorney, Agent, or Firm* — Loza & Loza, LLP/QUALCOMM Incorporated

(57) ABSTRACT

Aspects of the disclosure relate to reporting and correcting a spatial misalignment of an orbital angular momentum (OAM) waveform communicated from a second device to a first device. In an aspect, the first device receives from the second device, the OAM waveform having a spatial misalignment with respect to the second device. The first device determines the spatial misalignment and further determines spatial coordinates for correcting the spatial misalignment and/or one or more channel measurements of the OAM waveform. Thereafter, the first device sends a report based on the spatial misalignment to the second device, the report including the spatial coordinates for correcting the spatial misalignment and/or the one or more channel measurements. The first device then receives an adjusted OAM waveform from the second device, wherein the adjusted OAM waveform is received having a corrected spatial alignment with respect to the second device based on the report.

46 Claims, 19 Drawing Sheets

(56) References Cited

U.S. PATENT DOCUMENTS

| | | |
|---|---|---|
| 9,031,151 B1 | 5/2015 | Harris et al. |
| 9,077,577 B1 | 7/2015 | Ashrafi et al. |
| 9,379,926 B2 | 6/2016 | Berretta et al. |
| 9,838,128 B1 | 12/2017 | Rusch et al. |
| 10,371,508 B1 | 8/2019 | Ulander et al. |
| 11,088,752 B1 | 8/2021 | Klemes et al. |
| 11,139,867 B2 | 10/2021 | Sasaki et al. |
| 11,170,318 B2 | 11/2021 | Ashrafi |
| 11,202,211 B2 | 12/2021 | Sasaki et al. |
| 11,202,335 B2 | 12/2021 | Ashrafi |
| 11,228,363 B2 | 1/2022 | Sasaki et al. |
| 11,283,522 B2 | 3/2022 | Ashrafi |
| 11,342,976 B1 | 5/2022 | Dallal et al. |
| 11,368,198 B2 | 6/2022 | Hirabe |
| 2003/0137645 A1 | 7/2003 | Fluckiger |
| 2005/0239426 A1 | 10/2005 | Berretta et al. |
| 2009/0227252 A1 | 9/2009 | Fenech et al. |
| 2010/0073260 A1 | 3/2010 | Fujita |
| 2012/0295538 A1 | 11/2012 | Arcidiacono et al. |
| 2012/0307933 A1 | 12/2012 | Djordjevic et al. |
| 2013/0027034 A1 | 1/2013 | Elgort et al. |
| 2013/0235885 A1 | 9/2013 | Chen et al. |
| 2013/0285853 A1 | 10/2013 | Lee |
| 2014/0016181 A1 | 1/2014 | Dal Negro |
| 2014/0199066 A1 | 7/2014 | Martelli et al. |
| 2014/0205283 A1 | 7/2014 | Djordjevic et al. |
| 2014/0348423 A1 | 11/2014 | Ishiga |
| 2015/0030280 A1 | 1/2015 | Alu et al. |
| 2015/0055961 A1 | 2/2015 | Meyers et al. |
| 2015/0084636 A1 | 3/2015 | Popescu |
| 2015/0146815 A1 | 5/2015 | Berretta et al. |
| 2015/0194735 A1 | 7/2015 | Graceffo |
| 2015/0304152 A1 | 10/2015 | Chen et al. |
| 2015/0357710 A1 | 12/2015 | Li |
| 2016/0043794 A1 | 2/2016 | Ashrafi et al. |
| 2016/0044647 A1 | 2/2016 | Ashrafi et al. |
| 2016/0254897 A1 | 9/2016 | Berretta et al. |
| 2016/0292472 A1 | 10/2016 | Tamburini et al. |
| 2017/0026095 A1 | 1/2017 | Ashrafi et al. |
| 2017/0126460 A1 | 5/2017 | Dutronc et al. |
| 2017/0181183 A1 | 6/2017 | Sung et al. |
| 2017/0187442 A1 | 6/2017 | Luddy et al. |
| 2017/0331532 A1 | 11/2017 | Le-Ngoc |
| 2017/0353265 A1 | 12/2017 | Mansouri Rad et al. |
| 2018/0026817 A1 | 1/2018 | Graceffo et al. |
| 2018/0234285 A1 | 8/2018 | Djordjevic et al. |
| 2019/0020434 A1 | 1/2019 | Adachi et al. |
| 2019/0028165 A1 | 1/2019 | Adachi et al. |
| 2019/0149251 A1 | 5/2019 | Zenkyu |
| 2019/0165837 A1 | 5/2019 | Son et al. |
| 2019/0165849 A1 | 5/2019 | Ashrafi et al. |
| 2019/0198999 A1 | 6/2019 | Ashrafi |
| 2019/0334609 A1 | 10/2019 | Alavi et al. |
| 2020/0127709 A1 | 4/2020 | Klemes |
| 2020/0127729 A1 | 4/2020 | Klemes |
| 2020/0228195 A1 | 7/2020 | Sasaki et al. |
| 2020/0296599 A1 | 9/2020 | Sasaki et al. |
| 2020/0313307 A1 | 10/2020 | Lee et al. |
| 2020/0388935 A1 | 12/2020 | Lee et al. |
| 2021/0028965 A1 | 1/2021 | Dutronc et al. |
| 2021/0058118 A1 | 2/2021 | Sasaki et al. |
| 2021/0211168 A1 | 7/2021 | Sasaki et al. |
| 2021/0288699 A1 | 9/2021 | Hirabe |
| 2021/0320707 A1 | 10/2021 | Kamiya |
| 2021/0399766 A1 | 12/2021 | Zenkyu et al. |
| 2022/0021423 A1* | 1/2022 | Ahmed ............... H04B 7/0617 |
| 2022/0029301 A1 | 1/2022 | Dallal et al. |
| 2022/0029697 A1 | 1/2022 | Bakr et al. |
| 2022/0078780 A1 | 3/2022 | Choi et al. |
| 2022/0123803 A1 | 4/2022 | Rimalapudi et al. |
| 2023/0268976 A1* | 8/2023 | Neshaastegaran ....... H04B 7/01 375/267 |

FOREIGN PATENT DOCUMENTS

| | | | |
|---|---|---|---|
| JP | 2018037744 A | 3/2018 | |
| JP | 2019062297 A | 4/2019 | |
| WO | WO-2021077921 A1 * | 4/2021 | ............... G01S 3/46 |
| WO | 2021104518 A1 | 6/2021 | |

OTHER PUBLICATIONS

Partial International Search Report—PCT/US2022/030214—ISA/EPO—Aug. 22, 2022.

International Search Report and Written Opinion—PCT/US2022/030214—ISA/EPO—Sep. 13, 2022.

Yang Q., et al., "Capacity Analysis of OAM Millimeter Wave System in the Off-axis Misalignment Case", 2019 IEEE International Conference on Consumer Electronics—Taiwan (ICCE-TW), IEEE, May 20, 2019, pp. 1-2, XP033712642, the whole document.

Co-pending U.S. Appl. No. 17/351,526, inventor Horn; Idan, filed Jun. 18, 2021.

Co-pending U.S. Appl. No. 17/351,883, inventor Landis; Shay, filed Jun. 18, 2021.

Co-pending U.S. Appl. No. 17/352,047, inventor Horn; Idan, filed Jun. 18, 2021.

International Search Report and Written Opinion—PCT/US2022/030378—ISA/EPO—Aug. 24, 2022.

International Search Report and Written Opinion—PCT/US2022/030352—ISA/EPO—Aug. 26, 2022.

Rui C., et al., "Spectral and Energy Efficiency of Line-of-Sight OAM-MIMO Communication Systems", China Communications, China Institute Of Communications, Piscatway, NJ, USA, vol. 17, No. 9, Sep. 1, 2020 (Sep. 1, 2020), pp. 119-127, XP011811373, ISSN: 1673-5447, DOI: 10.23919/JCC.2020.09.010 [retrieved on Sep. 25, 2020] p. 121, right-hand column, line 7-p. 125, right-hand column, line 25, 1,2 figures.

Tamburini F., et al., "Encoding Many Channels on the Same Frequency Through Radio Vorticity: First Experimental Test", New Journal of Physics, IOP Institute of Physics, 2012, 18 Pages.

Wikipedia: "Orbital Angular Momentum of Light", Last Edited on May 20, 2021, pp. 1-9.

Arlt J., et al., "Generation of High-order Bessel Beams by Use of an Axicon", Optics Communications 177, doi:10.1016/s0030-4018(00)00572-1, Apr. 15, 2000, pp. 297-301.

NTT: "NTT Successfully Demonstrates 100 Gbps Wireless Transmission Using a New Principle (OAM multiplexing) as a World's First—New Groundbreaking Technology for Achieving Next Generation of 5G Systems—", Press Release, May 15, 2018, 9 pages.

Oldoni M., et al., "Space-Division Demultiplexing in Orbital-Angular-Momentum-Based MIMO Radio Systems", IEEE Transactions on Antennas and Propagation, vol. 63, No. 10, doi:10.1109/tap.2015.2456953, Oct. 2015, pp. 4582-4587.

Ren Y., et al., "Line-of-Sight Millimeter-Wave Communications Using Orbital Angular Momentum Multiplexing Combined With Conventional Spatial Multiplexing", IEEE Transactions on Wireless Communications, vol. 16, No. 5, doi: 10.1109/twc.2017.2675885, May 2017, pp. 3151-3161.

Trichili A., et al., "Optical Communication Beyond Orbital Angular Momentum", Scientific Reports, vol. 6, Article No. 27674, doi:10.1038/srep27674, Jun. 10, 2016, pp. 1-6.

Yan Y., et al., "High-capacity Millimetre-wave Communications with Orbital Angular Momentum Multiplexing", Nature Communications, vol. 5, Article No. 4876, doi:10.1038/ncomms5876, Sep. 16, 2014, pp. 1-9.

Yu S., et al., "Design, Fabrication, and Measurement of Reflective Metasurface for Orbital Angular Momentum Vortex Wave in Radio Frequency Domain", Applied Physics Letter, vol. 108, Article No. 121903, Mar. 23, 2016, 6 pages, doi:10.1063/1.4944789.

Zhang W., et al., "Mode Division Multiplexing Communication Using Microwave Orbital Angular Momentum: An Experimental Study", IEEE Transactions on Wireless Communications, vol. 16, No. 2, Feb. 2017, pp. 1308-1318, doi:10.1109/twc.2016.2645199.

(56) References Cited

OTHER PUBLICATIONS

Zhu F., et al., "Free-space Optical Communication Link Using Perfect Vortex Beams Carrying Orbital Angular Momentum (OAM)", Optics Communications, vol. 396, 2017, pp. 50-57.

* cited by examiner

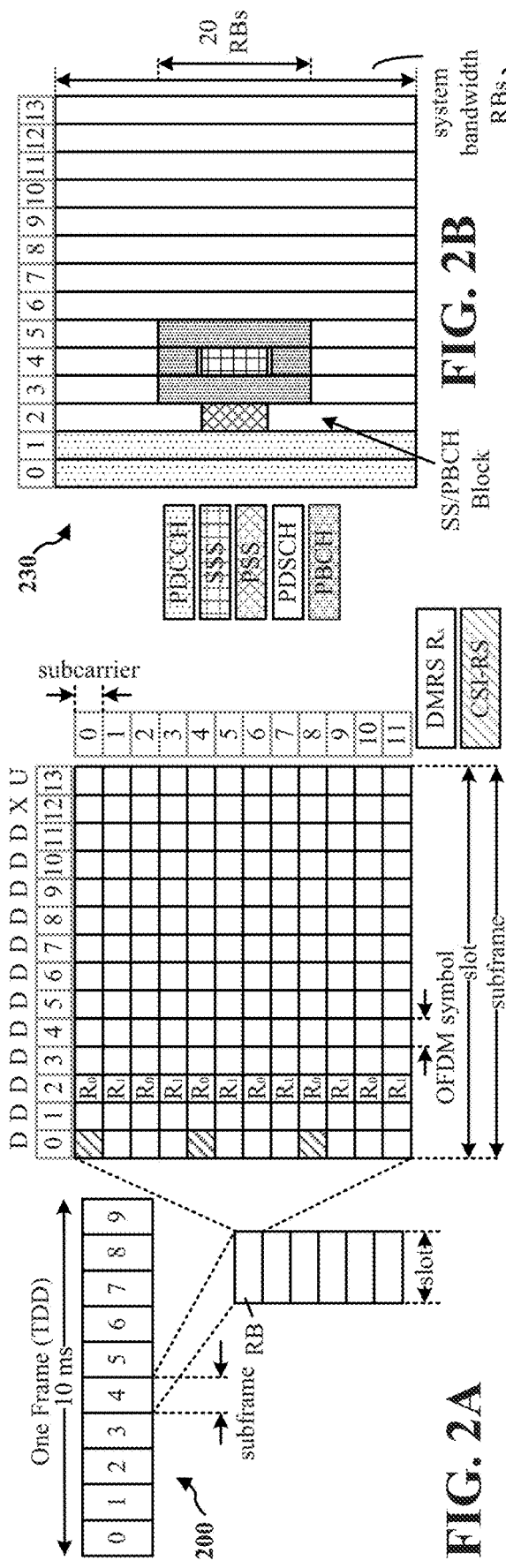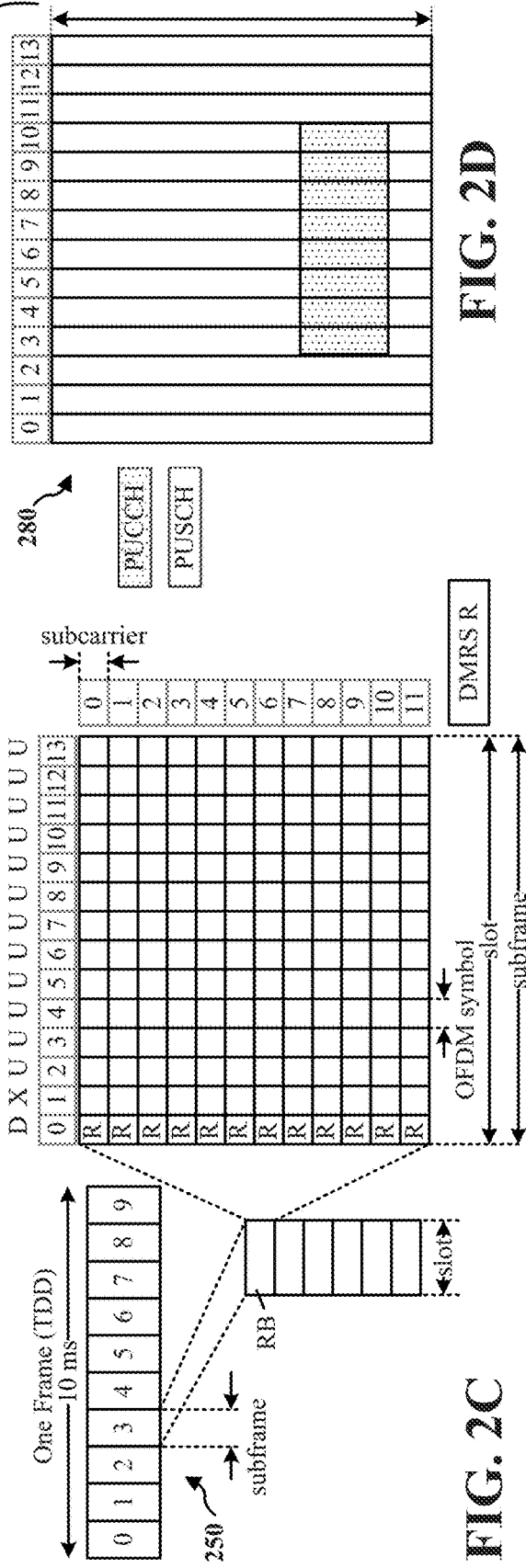
FIG. 2A  FIG. 2B  FIG. 2C  FIG. 2D

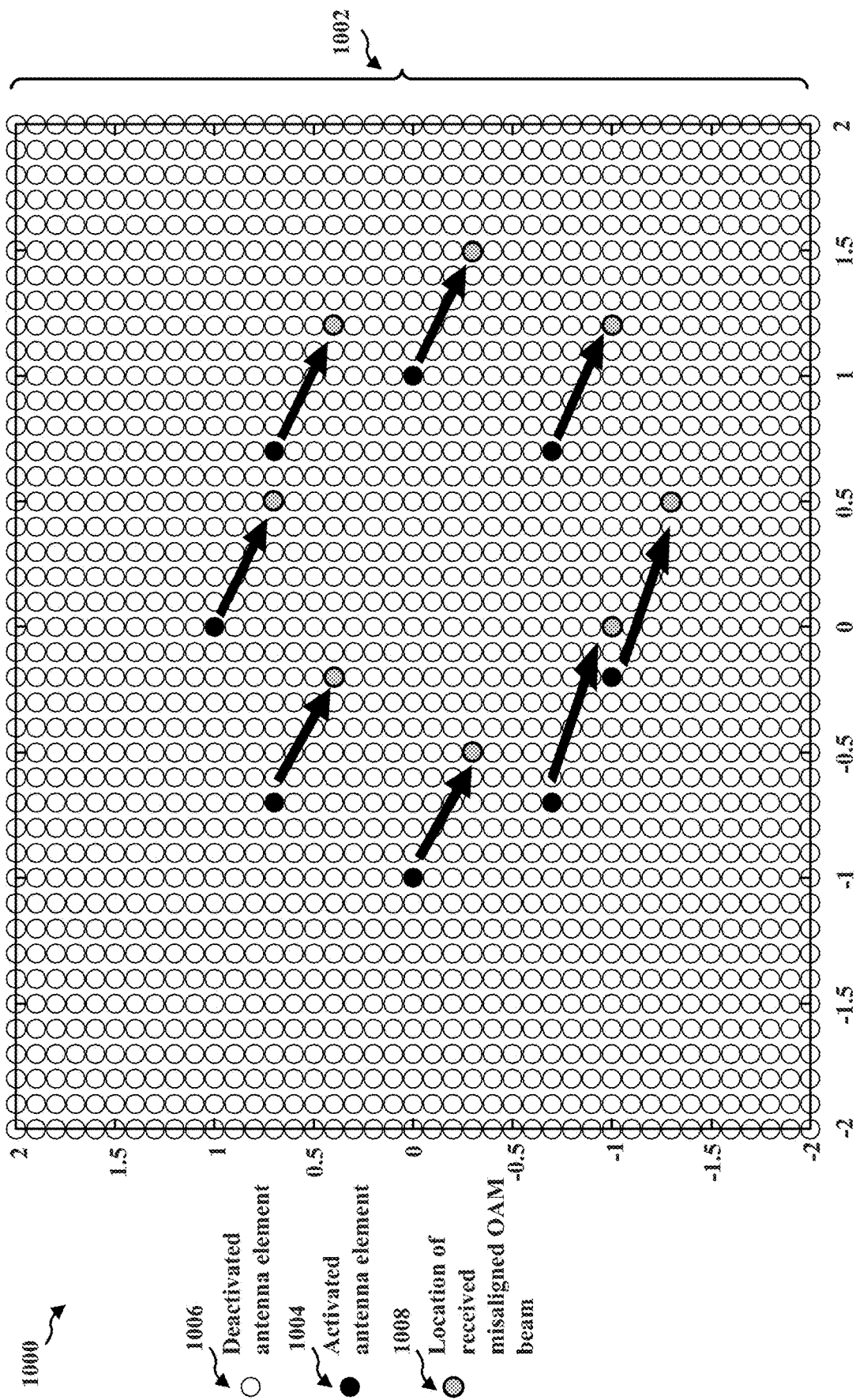

Off-Axis Misalignment

Non-Parallel Misalignment

SYSTEM AND METHOD FOR REPORTING ORBITAL ANGULAR MOMENTUM WAVEFORM MISALIGNMENT

INTRODUCTION

The present disclosure relates generally to communication systems, and more particularly, to correcting a spatial misalignment of a signal.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example telecommunication is 5G new radio (NR). 5G NR is part of a continuous mobile broadband evolution promulgated by Third Generation Partnership Project (3GPP) to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. As the demand for mobile broadband access continues to increase, there exists a need for further improvements in 5G NR technology. Preferably, these improvements should be applicable to other multi-access technologies and the telecommunication standards that employ these technologies.

SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a form as a prelude to the more detailed description that is presented later.

In one example, a method of wireless communication of a first device is disclosed. The method includes receiving, at a first device, an orbital angular momentum (OAM) waveform from a second device, wherein the OAM waveform is received having a spatial misalignment with respect to the second device, sending, from the first device to the second device, a report based on the spatial misalignment, wherein the report includes at least one of spatial coordinates for correcting the spatial misalignment or one or more channel measurements of the OAM waveform, and receiving, at the first device, an adjusted OAM waveform from the second device, wherein the adjusted OAM waveform is received having a corrected spatial alignment with respect to the second device based on the report.

In another example, a first device for wireless communication is disclosed. The first device includes at least one processor and a memory coupled to the at least one processor. The at least one processor and the memory are configured to receive, at a first device, an orbital angular momentum (OAM) waveform from a second device, wherein the OAM waveform is received having a spatial misalignment with respect to the second device, send, from the first device to the second device, a report based on the spatial misalignment, wherein the report includes at least one of spatial coordinates for correcting the spatial misalignment or one or more channel measurements of the OAM waveform, and receive, at the first device, an adjusted OAM waveform from the second device, wherein the adjusted OAM waveform is received having a corrected spatial alignment with respect to the second device based on the report.

In a further example, a first device for wireless communication is disclosed. The first device includes means for receiving, at a first device, an orbital angular momentum (OAM) waveform from a second device, wherein the OAM waveform is received having a spatial misalignment with respect to the second device, means for sending, from the first device to the second device, a report based on the spatial misalignment, wherein the report includes at least one of spatial coordinates for correcting the spatial misalignment or one or more channel measurements of the OAM waveform, and means for receiving, at the first device, an adjusted OAM waveform from the second device, wherein the adjusted OAM waveform is received having a corrected spatial alignment with respect to the second device based on the report.

In another example, a non-transitory computer-readable medium storing computer-executable code at a first device for wireless communication is disclosed. The non-transitory computer-readable medium includes code for causing a computer to receive, at a first device, an orbital angular momentum (OAM) waveform from a second device, wherein the OAM waveform is received having a spatial misalignment with respect to the second device, send, from the first device to the second device, a report based on the spatial misalignment, wherein the report includes at least one of spatial coordinates for correcting the spatial misalignment or one or more channel measurements of the OAM waveform, and receive, at the first device, an adjusted OAM waveform from the second device, wherein the adjusted OAM waveform is received having a corrected spatial alignment with respect to the second device based on the report.

In one example, a method of wireless communication of a second device is disclosed. The method includes transmitting, from a second device, an orbital angular momentum (OAM) waveform to a first device, wherein the OAM waveform is transmitted having a spatial misalignment with respect to the first device, receiving, at the second device from the first device, a report based on the spatial misalignment, wherein the report includes at least one of spatial coordinates for correcting the spatial misalignment or one or more channel measurements of the OAM waveform, and transmitting, from the second device, an adjusted OAM waveform to the first device, wherein the adjusted OAM waveform is transmitted having a corrected spatial alignment with respect to the first device based on the report.

In another example, a second device for wireless communication is disclosed. The second device includes at least one processor and a memory coupled to the at least one processor. The at least one processor and the memory are configured to transmit, from a second device, an orbital angular momentum (OAM) waveform to a first device, wherein the OAM waveform is transmitted having a spatial misalignment with respect to the first device, receive, at the second device from the first device, a report based on the spatial misalignment, wherein the report includes at least one of spatial coordinates for correcting the spatial misalignment or one or more channel measurements of the OAM waveform, and transmit, from the second device, an adjusted OAM waveform to the first device, wherein the adjusted OAM waveform is transmitted having a corrected spatial alignment with respect to the first device based on the report.

In a further example, a second device for wireless communication is disclosed. The first device includes means for transmitting, from a second device, an orbital angular momentum (OAM) waveform to a first device, wherein the OAM waveform is transmitted having a spatial misalignment with respect to the first device, means for receiving, at the second device from the first device, a report based on the spatial misalignment, wherein the report includes at least one of spatial coordinates for correcting the spatial misalignment or one or more channel measurements of the OAM waveform, and means for transmitting, from the second device, an adjusted OAM waveform to the first device, wherein the adjusted OAM waveform is transmitted having a corrected spatial alignment with respect to the first device based on the report.

In another example, a non-transitory computer-readable medium storing computer-executable code at a second device for wireless communication is disclosed. The non-transitory computer-readable medium includes code for causing a computer to transmit, from a second device, an orbital angular momentum (OAM) waveform to a first device, wherein the OAM waveform is transmitted having a spatial misalignment with respect to the first device, receive, at the second device from the first device, a report based on the spatial misalignment, wherein the report includes at least one of spatial coordinates for correcting the spatial misalignment or one or more channel measurements of the OAM waveform, and transmit, from the second device, an adjusted OAM waveform to the first device, wherein the adjusted OAM waveform is transmitted having a corrected spatial alignment with respect to the first device based on the report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 10 illustrates an example of an antenna array including a plurality of antenna elements in accordance with aspects of the present disclosure.

DETAILED DESCRIPTION

Figure 1:
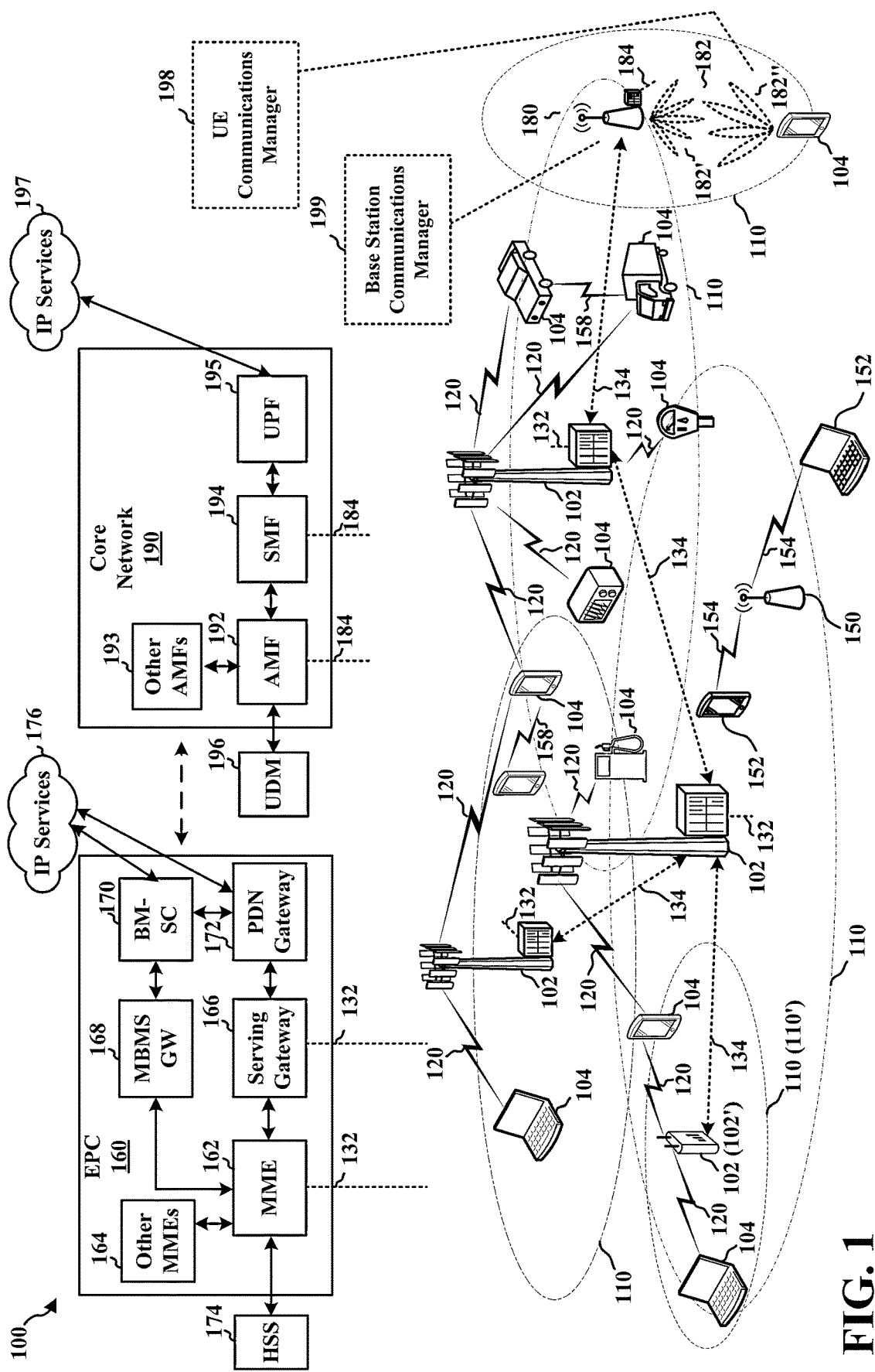
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Electromagnetic waves may be emitted or transmitted to carry an orbital angular momentum (OAM) associated with a helical structure of a wave front around an axis of a beam. As one example, the OAM of a light beam may correspond to a component of angular momentum of the light beam that is based on a field spatial distribution rather than polarization. In addition to light, a radio frequency signal may have an OAM helical structure. The RF signal may be a signal for wireless communication and comprise a beamformed signal that may be referred to herein as a "beam." The helical structure of the beam may be characterized by a wave front that is shaped as a helix with a vortex in the center (e.g., at the beam axis).

A helical structure of a signal may be characterized by a topological charge "m" that corresponds to a number of rotations that a helical structure exhibits in a path circling once around the center of a receiver. The topological charge m may comprise an integer and may be positive or negative depending on the direction in which the helical structure twists around the beam axis. The higher the value of the topological charge m, the faster the phase of the wave front rotates around a beam axis. The helical structure may also be characterized by an optical phase distribution and an intensity distribution corresponding to the topological charge m.

OAM beams may be useful as a transmission scheme for line-of-sight transmissions (e.g., waves travel in a direct path from a source to a receiver) in a wireless communication network. For example, OAM transmissions (also referred to as "OAM waveforms") may be useful for higher bands, such as the millimeter wave frequency band or higher frequency bands (e.g., FR2, FR4, etc.). However, OAM transmissions may also be sensitive to spatial misalignments between a transmitter and a receiver. For example, as the distance between the transmitter and the receiver increases, the displacement size and direction relative to the beam axis of the OAM transmission may have a stronger effect on reception of a signal. The misalignment may be due to aberrations in the medium over which the OAM transmission travels. In some examples, the misalignment may be due to changes in the physical locations of the transmitter and/or the receiver. For example, in a data center, a first wireless device may transmit an OAM transmission to a second wireless device. However, while operating, one or both of the wireless devices may be moved due to, for example, the operation of the devices, due to vibrations in the floor, etc.

In one example, when transmitting OAM beams/waveforms, an OAM-MIMO receiver may receive a signal with a mismatch (e.g., spatial misalignment between transmitter (Tx) antenna array and receiver (Rx) antenna array), making it more difficult for the OAM-MIMO receiver to separate and decode orthogonal OAM beams. OAM beams become less orthogonal when they are received with spatial misalignment. Moreover, if excessive spatial misalignment is present, then the phase pattern of the OAM beam/waveform may be affected and the OAM-MIMO receiver may not receive any signal at all. Small spatial misalignment can degrade spectral efficiency. As the spatial misalignment between the Tx antenna array and the Rx antenna array increases, spectral efficiency may degrade by factors.

Aspects of the disclosure provide for a method, an apparatus, and a computer-readable medium for supporting spatial misalignment correction of an orbital angular momentum (OAM) waveform communicated from a transmitting device (e.g., second device) to a receiving device (e.g., first device), wherein a transmitting device is a device which transmits the OAM waveform and the receiving device is a device which receives the OAM waveform. Aspects of the disclosure provide techniques for decreasing and/or eliminating the spatial misalignment to increase the efficiency of OAM beam communication. The spatial misalignment may be corrected at a receiver side (e.g., UE side) alone, but may be costly and inefficient to do so. For example, correction at the receiver side alone may require the presence and use of additional antennas different from the antennas used to receive the OAM beam affected by the misalignment. Accordingly, such an antenna array design (including the additional receiver antennas) may be expensive to implement, decrease efficiency, and/or reduce cost-effectiveness. Accordingly, aspects of the disclosure provide a more efficient technique for correcting the misalignment using both the transmitter side (e.g., gNB) and the receiver side. To correct the misalignment using both the transmitter side and the receiver side, the misalignment may first be estimated by the receiver side and then reported to the transmitter side to optimize performance. In some aspects, after determining the misalignment, the receiver side may attempt to correct the misalignment based on the misalignment being less than or equal to a threshold amount. In one example, if the misalignment is greater than the threshold amount, the receiver side may not be able to perform any misalignment correction. Accordingly, the receiver side may send a report regarding the misalignment to the transmitter side (e.g., when the misalignment is greater than the threshold amount) to prompt the transmitter side to correct the misalignment. The report to the transmitter side may include adjusted misalignment information reflecting the receiver side's best attempt at correction so that the transmitter side's attempt to correct will be bolstered by the receiver side's initial attempt. By communicating the misalignment report from the receiver side to the transmitter side, misalignment correction is facilitated to improve performance and robustness of OAM beam communication while mitigating and/or eliminating costly/inefficient techniques such as the use of additional receiver antennas.

Aspects disclosed herein support spatial misalignment correction of a signal carried via an OAM beam/waveform communicated between a transmitting device and a receiving device. For example, when the receiving device (e.g., UE) receives the OAM beam/waveform from the transmitting device (e.g., base station or gNB), the OAM beam/waveform may be received having a spatial misalignment with respect to the transmitting device. Accordingly, the receiving device may determine the spatial misalignment and determine spatial coordinates for correcting the spatial misalignment and/or one or more channel measurements of the OAM beam/waveform. The receiving device may then send a report to the transmitting device including the spatial coordinates and/or the one or more channel measurements. Thereafter, the receiving device may receive an adjusted OAM beam/waveform from the transmitting device, wherein the adjusted OAM beam/waveform has a corrected spatial alignment with respect to the transmitting device based on the report.

In another example, when the transmitting device transmits the OAM beam/waveform to the receiving device, the OAM beam/waveform may be transmitted having a spatial misalignment with respect to the receiving device. Accordingly, the transmitting device may receive a report from the receiving device based on the spatial misalignment. The report may include spatial coordinates for correcting the spatial misalignment and/or one or more channel measurements of the OAM beam/waveform. The transmitting device may then generate an adjusted OAM waveform based on the spatial coordinates and/or the one or more channel measurements. Thereafter, the transmitting device may transmit the adjusted OAM waveform to the receiving device, wherein the adjusted OAM waveform has a corrected spatial alignment with respect to the receiving device based on the report.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

In some examples, the wireless communications system and access network 100 may employ an open RAN (O-RAN) to provide a standardization of radio interfaces to procure interoperability between component radio equipment. For example, in an O-RAN, the RAN may be disaggregated into a centralized unit (O-CU), a distributed unit (O-DU), and a radio unit (O-RU). The O-RU is where radio frequency (RF) signals are transmitted, received, amplified, and/or digitized. The O-RU may be located at, near, or integrated with, an antenna. The O-DU and the O-CU provide computational functions and may facilitate the transmission of digitized radio signals within the network. The O-DU may be physically located at or near the O-RU. The O-CU may be located near the core network.

The O-DU provides downlink and uplink baseband processing, a supply system synchronization clock, signal processing, and an interface with the O-CU. The O-RU provides downlink baseband signal conversion to an RF signal, and uplink RF signal conversion to a baseband signal. The O-RAN may include an open fronthaul (FH) interface between the O-DU and the O-RU. Aspects of the disclosure, may be applicable to an aggregated RAN and/or to a disaggregated RAN (e.g., an O-RAN).

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point
(AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE communications manager 198 that may be configured to send a request to a BS to transmit an orbital angular momentum (OAM) waveform to the UE 104, and thereafter, receive the OAM waveform from the BS, wherein the OAM waveform is received having a spatial misalignment with respect to the BS. The UE communications manager 198 may further be configured to determine the spatial misalignment (e.g., off-axis misalignment, non-parallel misalignment, and/or rotational misalignment) and determine spatial coordinates for correcting the spatial misalignment. The UE communications manager 198 may also be configured to, additionally or alternatively, determine one or more channel measurements of the OAM waveform. Thereafter, the UE communications manager 198 may be configured to send to the BS, a report based on the spatial misalignment. The report may include the spatial coordinates for correcting the spatial misalignment and/or the one or more channel measurements of the OAM waveform. The UE communications manager 198 may further be configured to receive an adjusted OAM waveform from the BS, wherein the adjusted OAM waveform is received having a corrected spatial alignment with respect to the BS based on the report.

Referring again to FIG. 1, in certain aspects, the base station 102 may include a base station communications manager 199 that may be configured to receive a request from a UE to transmit an orbital angular momentum (OAM) waveform, and thereafter, transmit, the OAM waveform to the UE, wherein the OAM waveform is transmitted having a spatial misalignment (e.g., off-axis misalignment, non-parallel misalignment, and/or rotational misalignment) with respect to the UE. The base station communications manager 199 may further be configured to receive, from the UE, a report based on the spatial misalignment. The report may include spatial coordinates for correcting the spatial misalignment and/or one or more channel measurements of the OAM waveform. The base station communications manager 199 may also be configured to generate an adjusted OAM waveform based on the spatial coordinates for correcting the spatial misalignment and/or the one or more channel measurements of the OAM waveform, and transmit the adjusted OAM waveform to the UE, wherein the adjusted OAM waveform is transmitted having a corrected spatial alignment with respect to the UE based on the report.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. Aspects of the disclosure related to communicating OAM waveforms and reporting/correcting a spatial misalignment of the OAM waveform communicated to a first device (e.g., receiving device) from a second device (e.g., transmitting device) may implement signaling using the 5G/NR frame structure described with respect to FIGS. 2A, 2B, 2C, and 2D. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
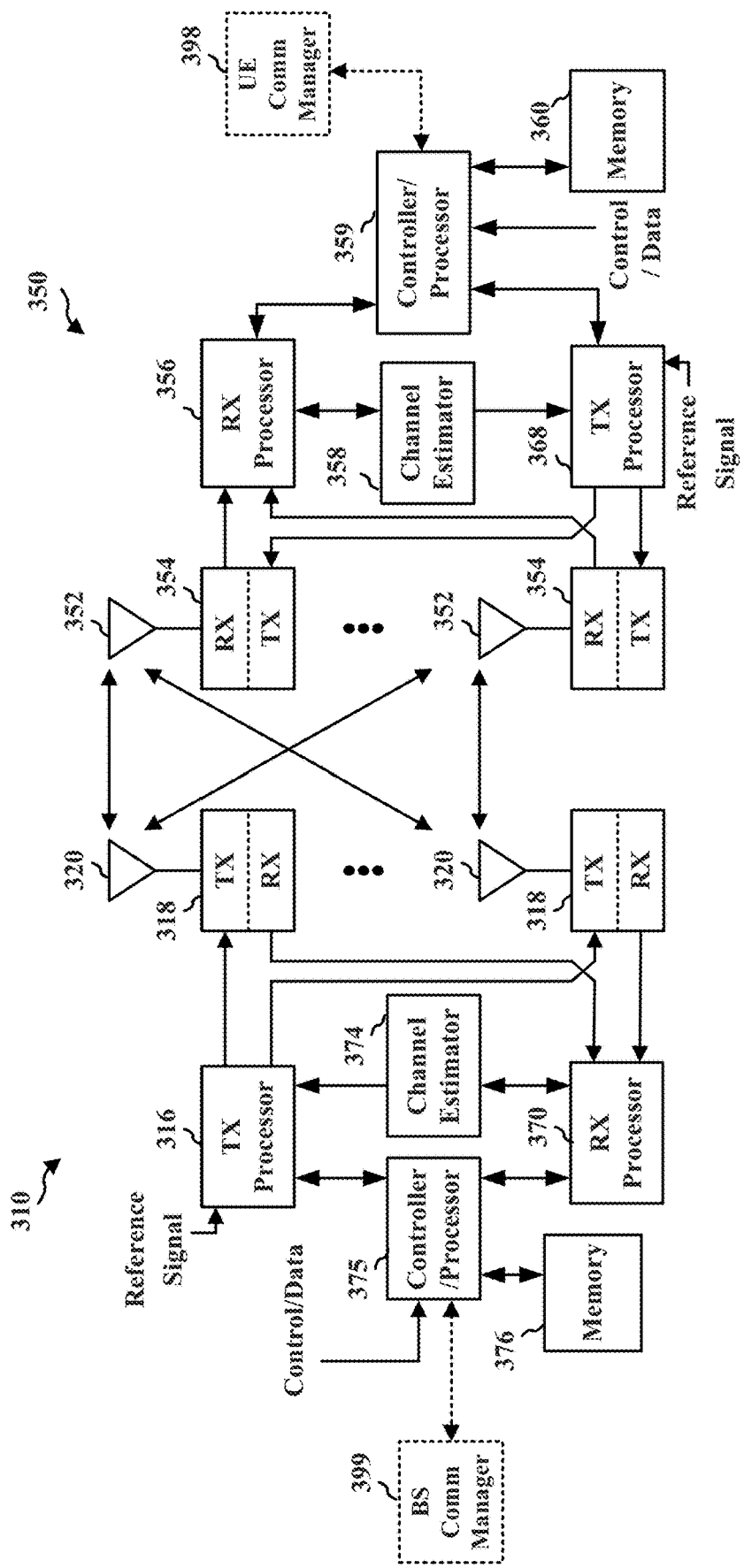
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission. Antennas 320 may correspond to antenna elements and/or antenna arrays described below with respect to FIGS. 6-13. Moreover, each transmitter 318TX may include a phase-shifter (e.g., phase-shifter 1716 of FIG. 17) for enabling digital and/or analog beamforming operations via a respective antenna 320 according to aspects of the present disclosure.

At the UE 350, each receiver 354RX receives a signal through its respective antenna 352. Antennas 352 may correspond to antenna elements and/or antenna arrays described below with respect to FIGS. 6-13. Each receiver 354RX may include a phase-shifter (e.g., phase-shifter 1516 of FIG. 15) for enabling digital and/or analog beamforming operations via a respective antenna 352 according to aspects of the present disclosure. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE communications manager 198 of FIG. 1. For example, the UE 350 may include a UE communications manager 398 configured to perform the operations described above with respect to the UE communications manager 198 of FIG. 1.

At least one of the TX processor 316, the RX processor 370, and the controller/processor 375 may be configured to perform aspects in connection with the BS communications manager 199 of FIG. 1. For example, the BS 310 may include a BS communications manager 399 configured to perform the operations described above with respect to the BS communications manager 199 of FIG. 1.

A beamforming technology (e.g., 5G NR mmW technology) may use beam management procedures, such as beam measurements and beam switches, to maintain a quality of a link between a base station (e.g., gNB) and a UE at a sufficient level. Beam management procedures aim to support mobility and the selection of the best beam pairing (or beam pair link (BPL)) between the base station and the UE. Beam selection may be based on a number of considerations including logical state, power saving, robustness, mobility, throughput, etc. For example, wide beams may be used for initial connection and for coverage/mobility and narrow beams may be used for high throughput scenarios with low mobility.

Figure 4A:
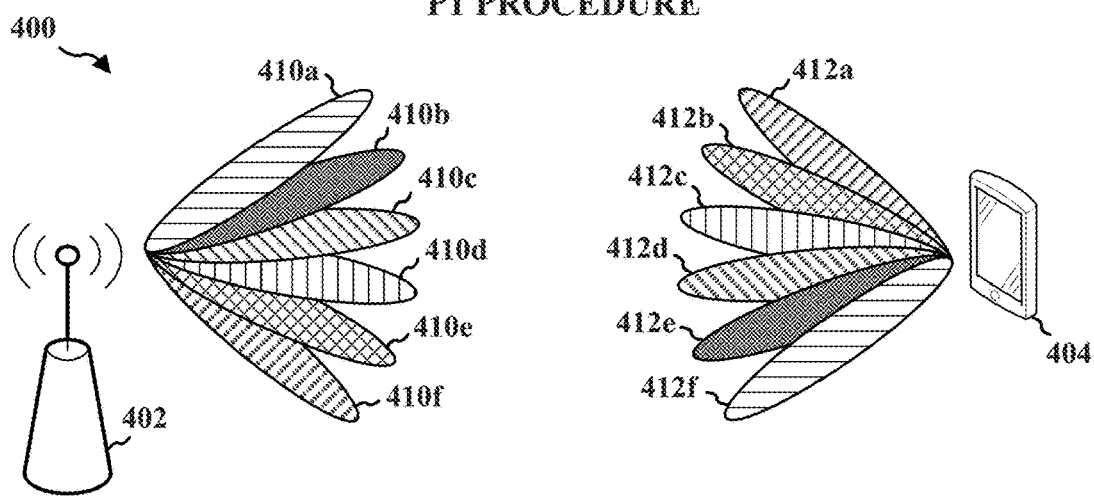
FIGS. 4A, 4B, and 4C illustrate an example of beam pair link (BPL) discovery and refinement in accordance with aspects of the present disclosure.
Figure 4B:
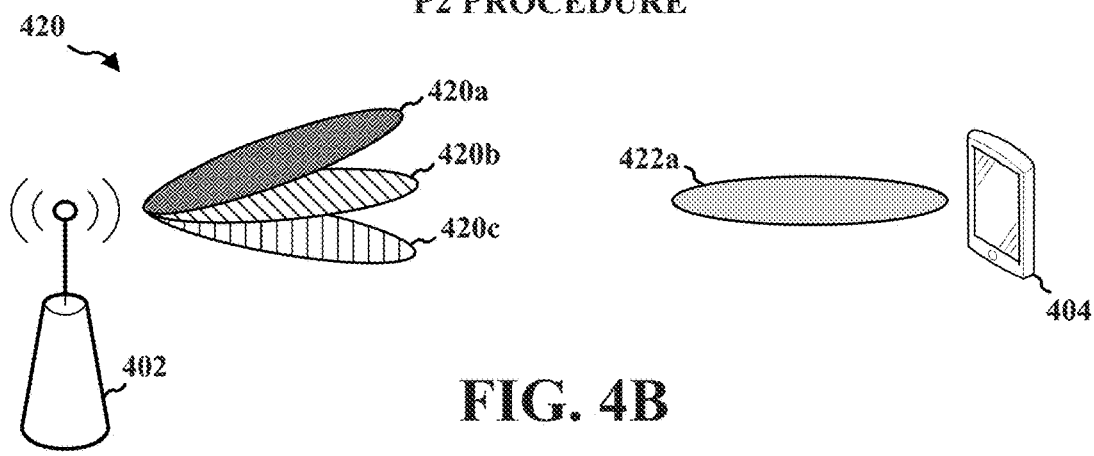
Figure 4C:
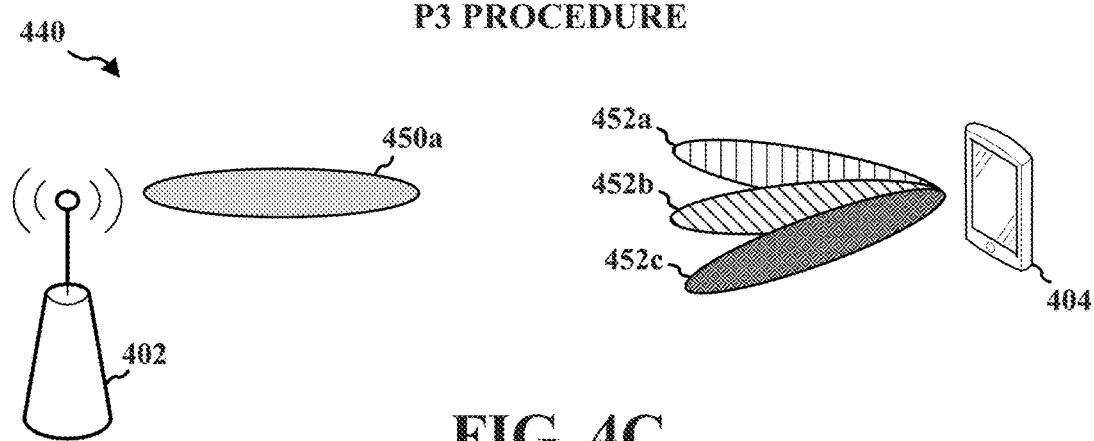

FIGS. 4A, 4B, and 4C illustrate an example of beam pair link (BPL) discovery and refinement. In 5G-NR, P-1, P2, and P3 procedures are used for BPL discovery and refinement. As described below, a BS 402 may include the BS communications manager 399 of FIG. 3 configured to perform the operations described above with respect to the BS communications manager 199 of FIG. 1. Moreover, the a UE 404 may include the UE communications manager 398 of FIG. 3 configured to perform the operations described above with respect to the UE communications manager 198 of FIG. 1.

The network uses a P1 procedure to enable the discovery of new BPLs. Referring to FIG. 4A, in a P1 procedure 400, the BS 402 transmits different symbols of a reference signal (e.g., P1 signal), each beamformed in a different spatial direction such that several (most, all) relevant places of the cell are reached. Stated otherwise, the BS 402 transmits beams using different transmit beams (e.g., transmit beams 410a to 410f) over time in different directions. For successful reception of at least a symbol of the P1 signal, the UE 404 searches for an appropriate receive beam. The UE 404 searches using available receive beams (e.g., receive beams 412a to 412f) and applying a different UE receive beam during each occurrence of the periodic P1 signal.

Once the UE 404 has succeeded in receiving a symbol of the P1 signal, the UE 404 has discovered a BPL. In some aspects, the UE 404 may not want to wait until it has found the best UE receive beam, since this may delay further actions. The UE 404 may measure a signal strength (e.g., reference signal receive power (RSRP)) and report the symbol index together with the RSRP to the BS 402. Such a report may contain the findings of one or more BPLs. In an example, the UE 404 may determine a received signal having a high RSRP. The UE 404 may not know which transmit beam the BS 402 used to transmit; however, the UE 404 may report to the BS 404 the time at which it observed the signal having a high RSRP. The BS 402 may receive this report and may determine which transmit beam the BS 402 used at the given time.

The BS 402 may then offer P2 and P3 procedures to refine an individual BPL. Referring to FIG. 4B, the P2 procedure 420 refines the BS beam (transmit beam) of a BPL. The BS 402 may transmit a set of symbols of a reference signal with different BS beams that are spatially close to the BS beam of the BPL (i.e., the BS 402 performs a sweep using neighboring beams around the selected beam). For example, the BS 402 may transmit a plurality of transmit beams (e.g., transmit beams 420a, 420b, and 420c) over a consecutive sequence of symbols, with a different beam per symbol. In the P2 procedure 420, the UE 404 keeps its receive beam (e.g., receive beam 422a) constant. Thus, the UE 404 uses the same beam as in the BPL. The BS beams used for the P2 procedure 420 may be different from those used for the P1 procedure in that they may be spaced closer together or they may be more focused. The UE 404 may measure the signal strength (e.g., RSRP) for the various BS beams (e.g., beams 420a, 420b, and 420c) and indicate the strongest BS beam and/or the highest RSRP to the BS 402. Additionally or alternatively, the UE 404 may indicate all RSRPs measured for the BS beams The UE 404 may indicate such information via a CSI-RS resource indicator (CRI)-L1-RSRP feedback message, which may contain the BS beams' RSRPs in a sorted manner The BS 402 may switch an active beam to the strongest BS beam reported, thus keeping the BPL's RSRP at a highest level and supporting low mobility. If the transmit beams used for the P2 procedure are spatially close (or even partially overlapped), no beam switch notification may be sent to the UE 404.

Referring to FIG. 4C, the P3 procedure 440 refines the UE beam (receive beam) of a BPL. Here, the BS 402 transmits the same transmit beam 450a over a consecutive sequence of symbols. The UE 404 may use this opportunity to refine the UE receive beam by checking a strength of multiple receive beams (from the same or different UE panels). That is, while the BS beam stays constant, the UE 404 may scan using different receive beams (i.e., the UE 404 performs a sweep using neighboring beams (e.g., receive beams 452a, 452b, and 452c)). The UE 404 may measure the RSRP of each UE beam (receive beam) and identify the best UE beam. Afterwards, the UE 404 may use the best UE beam for the BPL. The UE 404 may or may not send a report of receive beam RSRP(s) to the BS 402. By the end of the P2 and P3 procedures, the refined BS transmit beam and the refined UE receive beam maximize the BPL's RSRP.

In an aspect, spectral efficiency within spectrum based communications systems may be improved via the application of electromagnetic wave fronts using a property of electromagnetic waves or photons known as orbital angular momentum (OAM). The electromagnetic wave fronts can access an entire electromagnetic spectrum for radio frequencies through visible light and beyond. Twisted electromagnetic waves, or light beams, have helical wave fronts that carry OAM. Different OAM carrying waves/beams can be mutually orthogonal to each other within the spatial domain, allowing the waves/beams to be efficiently multiplexed and demultiplexed within a link Moreover, OAM beams may allow for the multiplexing of multiple independent data carrying channels into a single frequency.

Figure 5:
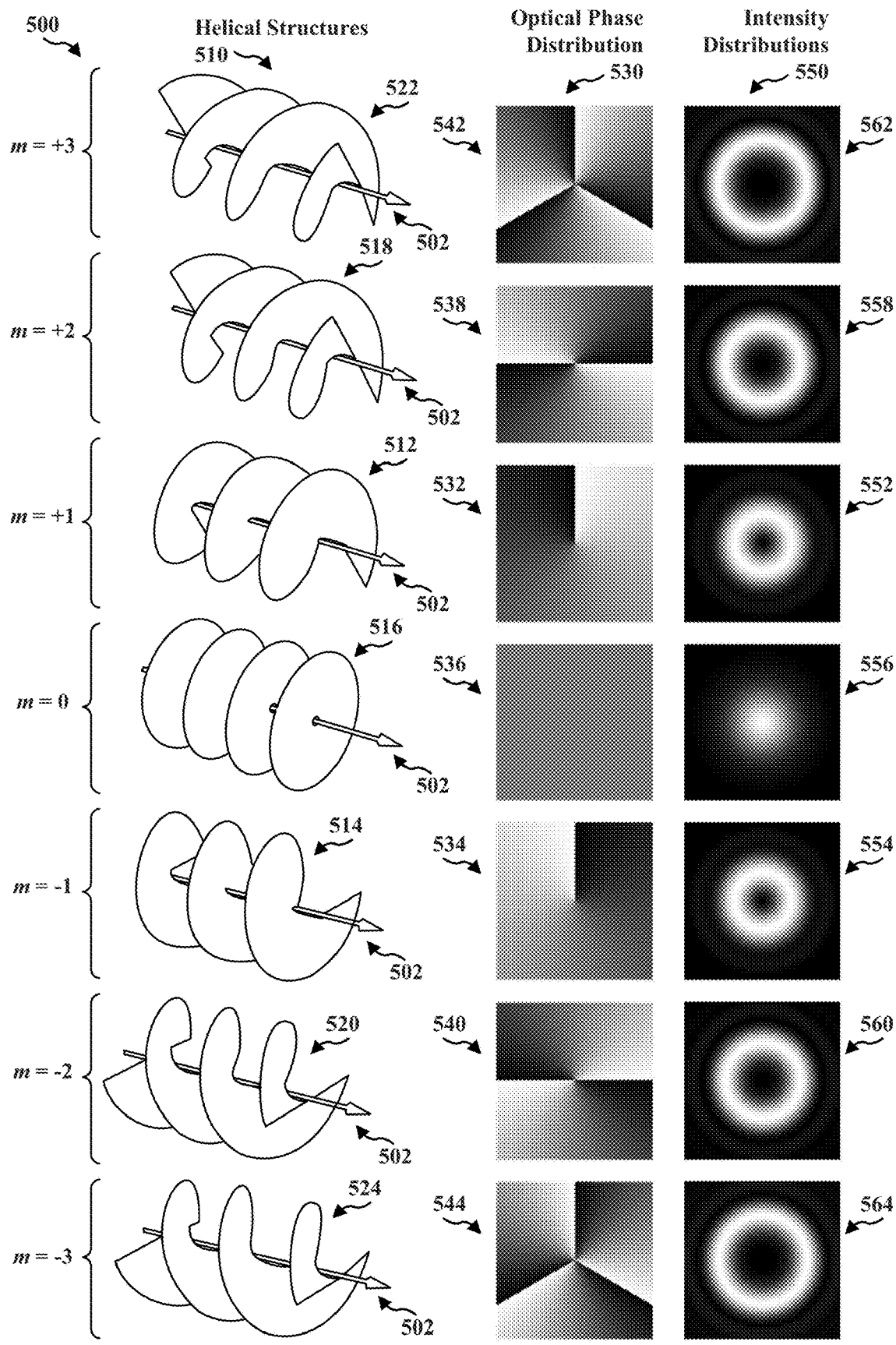
FIG. 5 is a diagram depicting examples of different helical structures (beams or wave fronts) and corresponding optical phase distributions and intensity distributions.

In an aspect, an OAM beam transmitted from an antenna array may have an increased linearity with respect to a phase of the OAM beam. For example, the OAM beam may be a signal transmitted from an antenna array having a circle form (e.g., circular antenna array). Accordingly, starting at a given point on the circle, when increasing the phase of the signal incrementally (e.g., going around a circumference of the circle or a beam axis) to the same point, a phase rotation of 2π in the signal will be completed. An amplitude of the signal may be constant but the phase will vary until the same point (point having the phase rotation of 2π) is reached. According to this operation of incrementally increasing the phase based on 2π (or a factor of 2π, such as −6π, −4π, −2π, 4π, 6π, etc.), different beam patterns may be realized (e.g., beam patterns depicted in FIG. 5). Referring to FIG. 5, each beam pattern describes an index, topological charge, or helical mode m (e.g., m=+3, +2, +1, 0, −1, −2, or −3), which indicates the number of 2π phase rotations completed as the phase of the signal is incrementally increased.

A spatial phase dependence factor Φ of an OAM beam may be characterized by Equation 1 below:

$$\Phi(\theta)=e^{im\theta}.$$ Equation 1:

In Equation 1, the parameter "θ" represents an angle measure around an axis (e.g., a beam axis). The parameter "m" represents a topological charge and corresponds to a number of rotations that a helical structure (sometimes referred to as a "helical beam" or "helical wave front") exhibits in a path circling once around the center of a receiver. The topological charge may comprise an integer and may be positive or negative depending on the direction in which the helical structure twists. The higher the value of the topological charge m, the faster the phase of the wave front rotates around a beam axis. As an example, for OAM for light, the wave front rotates around a beam axis. For an example with a radio frequency OAM, the beam axis may refer to an axis of the RF signal beam. The parameter "m8" represents the phase difference acquired over the course of a cycle for the topological charge m.

FIG. 5 is a diagram 500 depicting examples of different helical structures (beams or wave fronts) 510 and corresponding optical phase distributions 530 and intensity distributions 550. Each of the helical structures 510 depicts a shape of the helical structure (e.g., beam/wave pattern) and may be characterized by the topological charge m. Each of the optical phase distributions 530 depict the corresponding optical phase distributions in a beam cross-section. Each of the intensity distributions 550 depict the light intensity distribution in a beam cross-section. In some examples, the intensity distributions 550 may be referred to as a "vortex."

For example, a first helical structure 512 ("m=+1") is characterized by one rotation of phase around a beam axis 502, and in a first direction. A first optical phase distribution 532 corresponding to the first helical structure 512 indicates one cycle. That is, if a receiving element is placed perpendicular to the beam axis 502, the phase measured at the receiving element indicates that the first helical structure 512 is shaped as a single helical surface and completes one cycle (e.g., 0 to 2π) of phase rotation around the beam axis 502. A first intensity distribution 552 corresponding to the first helical structure 512 indicates a luminous intensity measured at the receiving element for the first helical structure 512. Because of the twisting nature of the first helical structure 512, the light waves at the beam axis 502 cancel each other. When projected onto a flat surface (e.g., the receiving element placed perpendicular to the beam axis 502), the intensity distribution (or "optical vortex") appears as a ring of light with a dark vortex core in the center. The dark cortex core (also referred to as a "singularity") corresponds to a region of low intensity.

The example of FIG. 5 includes a second helical structure 514 ("m=−1") that is also characterized by one rotation of phase around the beam axis 502. As shown in FIG. 5, the second helical structure 514 is based on an opposite rotational direction of the first helical structure 512. For example, the first optical phase distribution 532 indicates a clockwise rotation of the first helical structure 512 and a second optical phase distribution 534 corresponding to the second helical structure 514 indicates a counter-clockwise rotation of the second helical structure 514. A second intensity distribution 554 corresponding to the second helical structure 514 indicates a similar intensity distribution as the first intensity distribution 552.

The example of FIG. 5 also includes a third helical structure 516 ("m=0") that is characterized by zero rotations around the beam axis 502. That is, the third helical structure 516 indicates that the corresponding beam is not helical-shaped. As a result, the wave fronts associated with the third helical structure 516 are depicted as multiple disconnected surfaces, such as a sequence of parallel planes. As there is no "twist" or phase rotation associated with the third helical structure 516, a third optical phase distribution 536 corresponding to the third helical structure 516 indicates a same phase. Additionally, as there is no twist in the phase rotation associated with the third helical structure 516, a corresponding third intensity distribution 556 does not depict a singularity at the center since the light waves associated with the third helical structure 516 do not cancel each other out.

The example of FIG. 5 also includes a fourth helical structure 518 ("m=+2") and a fifth helical structure 520 ("m=−2"). The fourth helical structure 518 and the fifth helical structure 520 are characterized by two rotations around the beam axis 502. As shown in FIG. 5, the fifth helical structure 520 is based on an opposite rotational direction of the fourth helical structure 518. A fourth optical phase distribution 538 corresponding to the fourth helical structure 518 indicates that the fourth helical structure 518 is shaped as a double helical surface and completes two cycles (e.g., two completions of 0 to 2π or 4π) of phase rotation around the beam axis 502. Additionally, the singularity at a fourth intensity distribution 558 corresponding to the fourth helical structure 518 is larger than, for example, the first intensity distribution 552 as the additional "twists" associated with the fourth helical structure 518 provide additional light beams to cancel each other out, resulting in an increased low intensity region.

A fifth optical phase distribution 540 corresponding to the fifth helical structure 520 indicates that the fifth helical structure 520 is based on an opposite rotational direction of the fourth helical structure 518. For example, the fourth optical phase distribution 538 indicates two clockwise rotations of the fourth helical structure 518 and the fifth optical phase distribution 540 indicates two counter-clockwise rotations of phase of the fifth helical structure 520. A fifth intensity distribution 560 corresponding to the fifth helical structure 520 indicates a similar intensity distribution as the fourth intensity distribution 558.

The example of FIG. 5 also includes a sixth helical structure 522 ("m=+3") and a seventh helical structure 524 ("m=−3"). The sixth helical structure 522 and the seventh helical structure 524 are characterized by three rotations around the beam axis 502. As shown in FIG. 5, the seventh helical structure 524 is based on an opposite rotational direction of the sixth helical structure 522. A sixth optical phase distribution 542 corresponding to the sixth helical structure 522 indicates that the sixth helical structure 522 is shaped as a triple helical surface and completes three cycles (e.g., three completions of 0 to 2π or 6π) of phase rotation around the beam axis 502. Additionally, the singularity at a sixth intensity distribution 562 corresponding to the sixth helical structure 522 is larger than, for example, the first intensity distribution 552 as the additional "twists" associated with the sixth helical structure 522 provide additional light beams to cancel each other out, resulting in an increased low intensity region.

A seventh optical phase distribution 544 corresponding to the seventh helical structure 524 indicates that the seventh helical structure 524 is based on an opposite rotational direction of the sixth helical structure 522. For example, the sixth optical phase distribution 542 indicates three clockwise rotations of the sixth helical structure 522 and the seventh optical phase distribution 544 indicates three counter-clockwise rotations of phase of the seventh helical structure 524. A seventh intensity distribution 564 corresponding to the seventh helical structure 524 indicates a similar intensity distribution as the sixth intensity distribution 562.

OAM beams may be useful as a transmission scheme for line-of-sight transmissions in a wireless communication network, such as the access network 100 of FIG. 1. For example, OAM transmissions (also referred to as "OAM waveforms") may be useful for higher bands, such as the millimeter wave frequency band or higher frequency bands (e.g., FR2, FR4, etc.). When employing MIMO technology, each topological charge of an OAM transmission may correspond to an orthogonal carrier.

Figure 6:
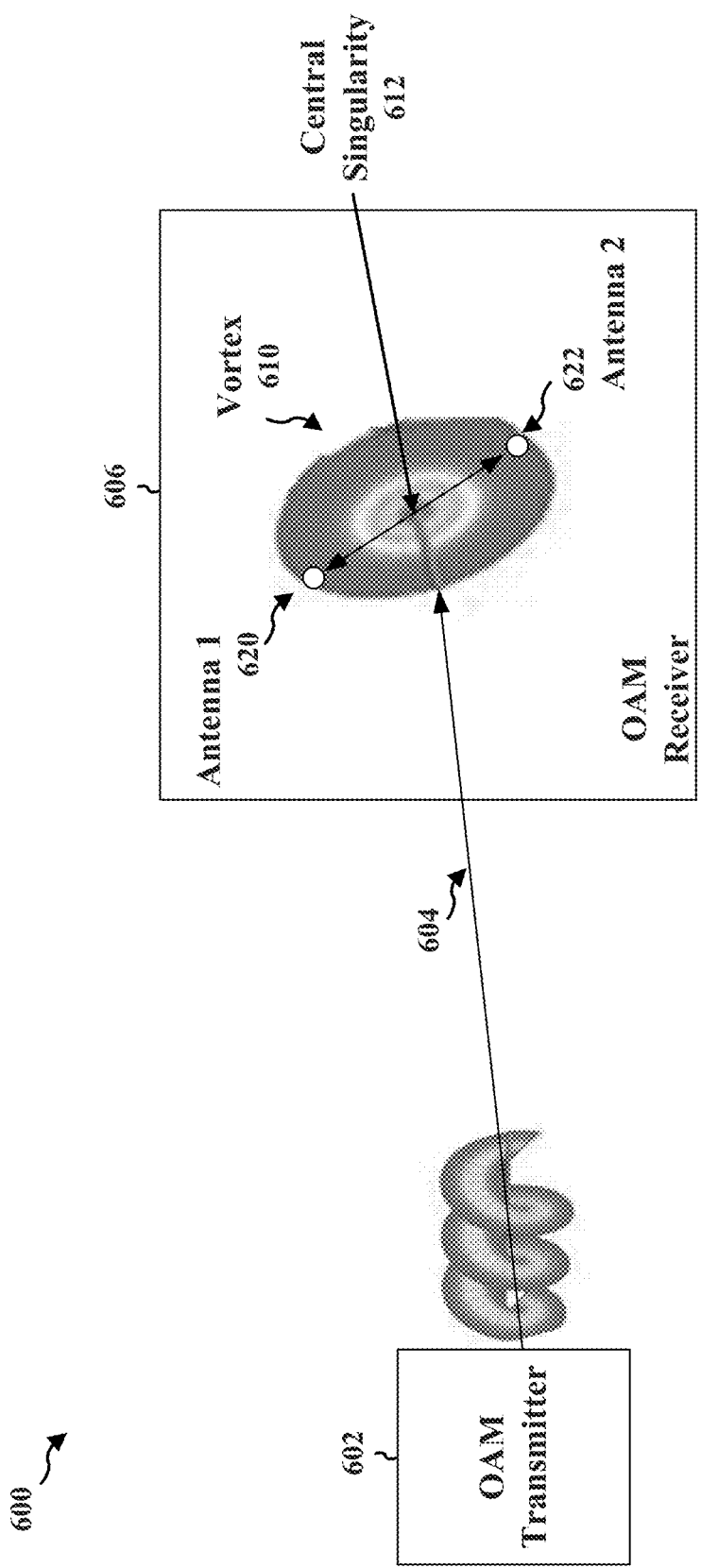
FIG. 6 depicts an example of an OAM transmission transmitted by an OAM transmitter and received by an OAM receiver in accordance with aspects of the present disclosure.

A helical structure for use in wireless communication may be generated using various techniques. As an example, FIG. 6 depicts an example 600 of an OAM transmission transmitted by an OAM transmitter 602 and received by an OAM receiver 606. In some examples, the OAM transmitter 602 may include a component that is configured to generate a helical structure with a particular topological charge. In some examples, an optical element, such as a lens, may be employed to generate the desired helical structure. For example, a lens may be positioned and configured so that a beam output by the OAM transmitter 602 is shaped with a particular topological charge (e.g., m=+1, m=−1, etc.). In other examples, a lens may not be used.

An antenna array at a receiver may receive the OAM transmission output by the OAM transmitter 602. The OAM transmission may comprise a beam axis 604, e.g., an axis of a beamformed signal. FIG. 6 depicts a vortex 610 that may correspond to the intensity distribution of the OAM transmission. The vortex 610 includes a singularity 612 associated with a low intensity region.

The OAM transmission may be received at multiple antenna elements at the OAM receiver 606, such as a first antenna element 620 ("Antenna 1") and a second antenna element 622 ("Antenna 2"). The OAM receiver 606 may compare the detected phases around the singularity 612 to determine the topological charge associated with the OAM transmission. For example, the OAM receiver 606 may measure the phase at the first antenna element 620 and the phase at the second antenna element 622 relative to the singularity 612 to determine the topological charge associated with the OAM transmission. In some examples, the number of antenna elements at which measurements are made may be based on the topological charge.

For example, the receiver may use a number of antenna elements based on Equation 2 below:

$$\text{Number of elements} \geq 2|m|+1. \quad \text{Equation 2:}$$

In Equation 2, the number of antenna elements is determined as at least one more than twice the absolute value of the topological charge. For example, to detect a topological charge of m=+1 or m=−1, the receiver may employ at least three antenna elements to measure the phase. However, in some examples, the number of elements may depend on the configuration of the elements at the OAM receiver 606.

In some examples, reception of OAM transmissions may be sensitive to spatial shift misalignments between a transmitter and a receiver. For example, as the distance between the transmitter and the receiver increases, the displacement size and direction relative to the beam axis of the OAM transmission may have an increased effect on accurate reception of the OAM transmission. The misalignment may be due to aberrations in the medium over which the OAM transmission travels. In some examples, the misalignment may be due to changes in the physical locations of the transmitter and/or the receiver. For example, in a data center, a first wireless device (e.g., a server rack) may transmit an OAM transmission to a second wireless device. However, while operating, one or both of the wireless devices may be moved due to, for example, the operation of the wireless devices, due to vibrations in the floor, etc.

Figure 7:
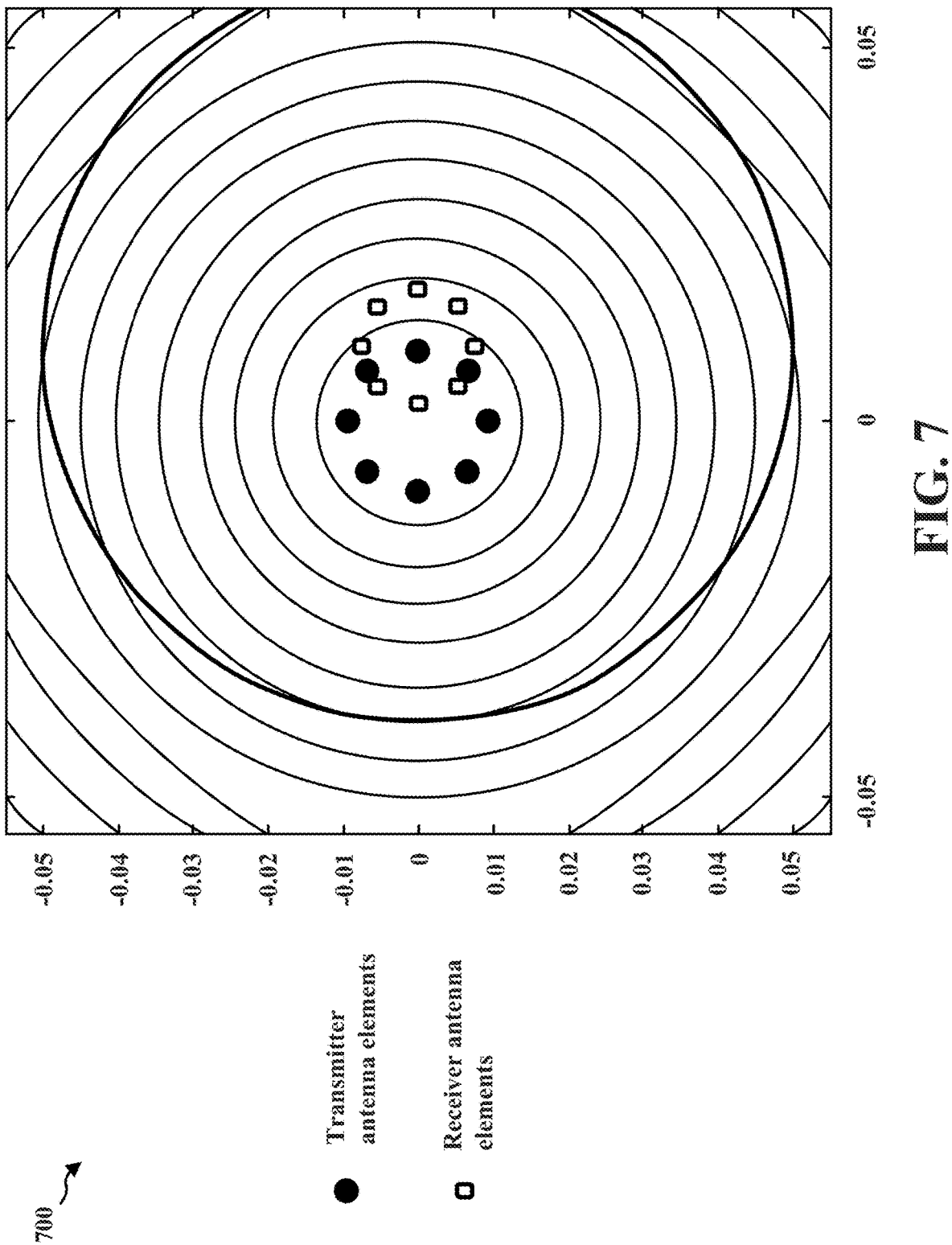
FIG. 7 illustrates a diagram depicting misalignment between a transmitter and a receiver of an OAM transmission in accordance with aspects of the present disclosure.

FIG. 7 illustrates a diagram 700 depicting misalignment between a transmitter and a receiver of an OAM transmission. In the illustrated example, a transmitter transmits an OAM transmission using eight transmitter antenna elements (shown as eight solid circles in the center of the diagram 700). A receiver receives the OAM transmission at locations corresponding to eight receiver antenna elements (shown as eight circles near the center of the diagram 700).

Aspects disclosed herein provide a framework to facilitate tracking and correcting spatial (e.g., off-axis, non-parallel, and/or rotational) misalignment for wireless communication based on OAM transmissions. For example, aspects presented herein provide for the generation and transmission of misalignment tracking reference signals (RSs) that allow a receiver to detect a misalignment and/or correct the misalignment in order to more accurately receive an OAM transmission. The detection and correction of the misalignment may enable a transmitter and receiver to improve alignment, and thereby to improve reception of an OAM transmission. The example misalignment tracking RSs may comprise a first misalignment tracking RS and a second misalignment tracking RS, which may be separated in a time-domain and/or a frequency-domain. For example, the first misalignment tracking RS may be transmitted and received at a first symbol and the second misalignment tracking RS may be transmitted and received at a second, consecutive symbol. In some examples, the misalignment tracking reference signals may be repetitions. The first misalignment tracking RS may include a first helical phase structure (e.g., with a topological charge of m=1), and the second misalignment tracking RS may comprise a second helical phase structure, e.g., with the second helical phase structure based on an opposite rotational direction (e.g., with a topological charge of m=−1) of the first helical phase structure.

The misalignment tracking RS may be a reference signal that allows for detecting misalignment with respect to OAM transmissions. For example, the RS may be different than existing reference signals, such as CSI-RS, BRS, PT-RS, and/or SSB, which enable a receiving device to determine information regarding channel quality, timing, and/or power estimation associated with a transmission. However, reference signals such as CSI-RS, BRS, PT-RS, SSB, etc., may not provide information to allow the receiving device to determine a receiver misalignment due to the nature of OAM transmissions. For example, the misalignment tracking RSs disclosed herein facilitate determining an off-axis, non-parallel, and/or rotational misalignment associated with an OAM transmission.

Figure 8:
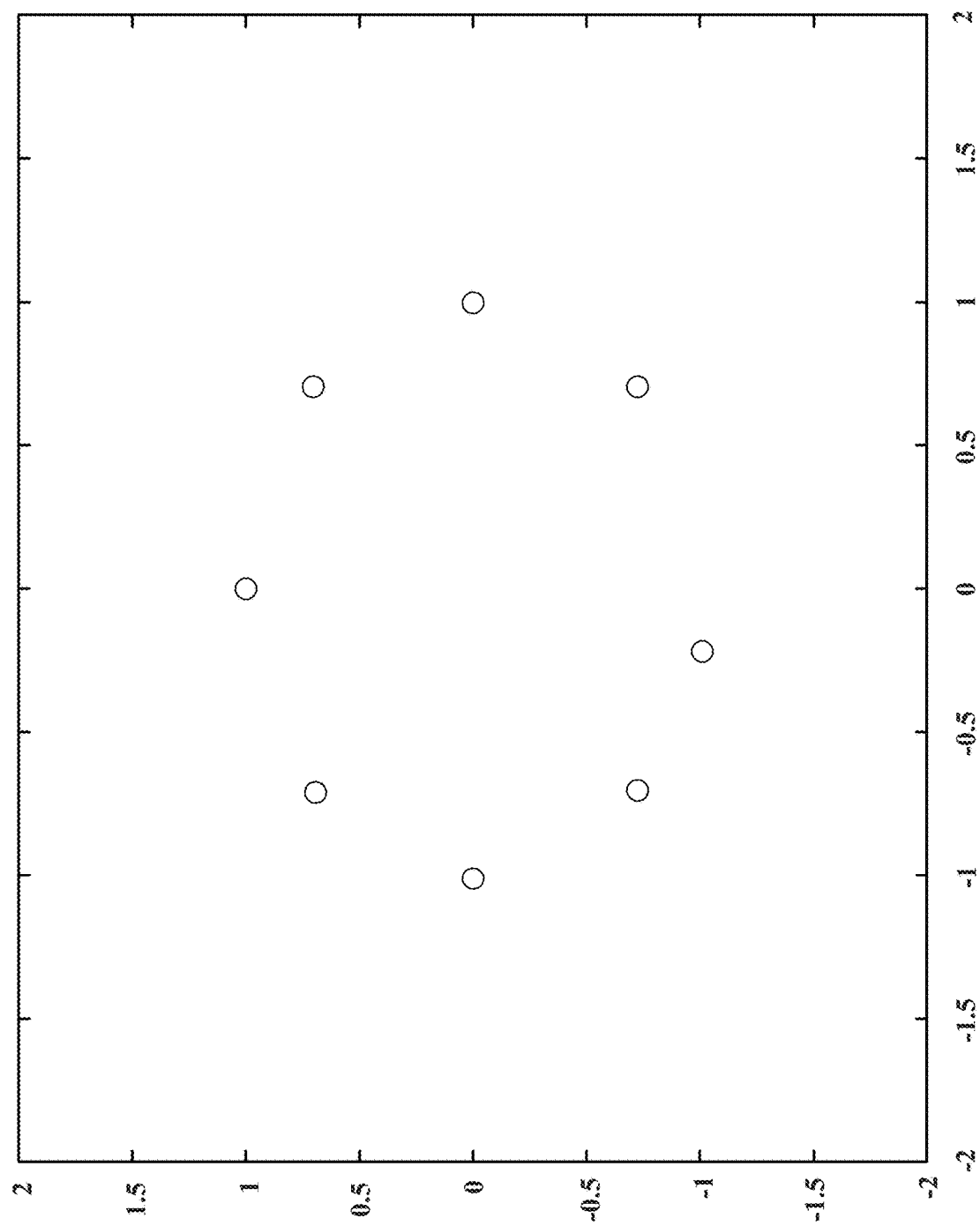
FIG. 8 illustrates and example implementation of an antenna array that may be used to transmit and receive an OAM transmission in accordance with aspects of the present disclosure.
Figure 9:
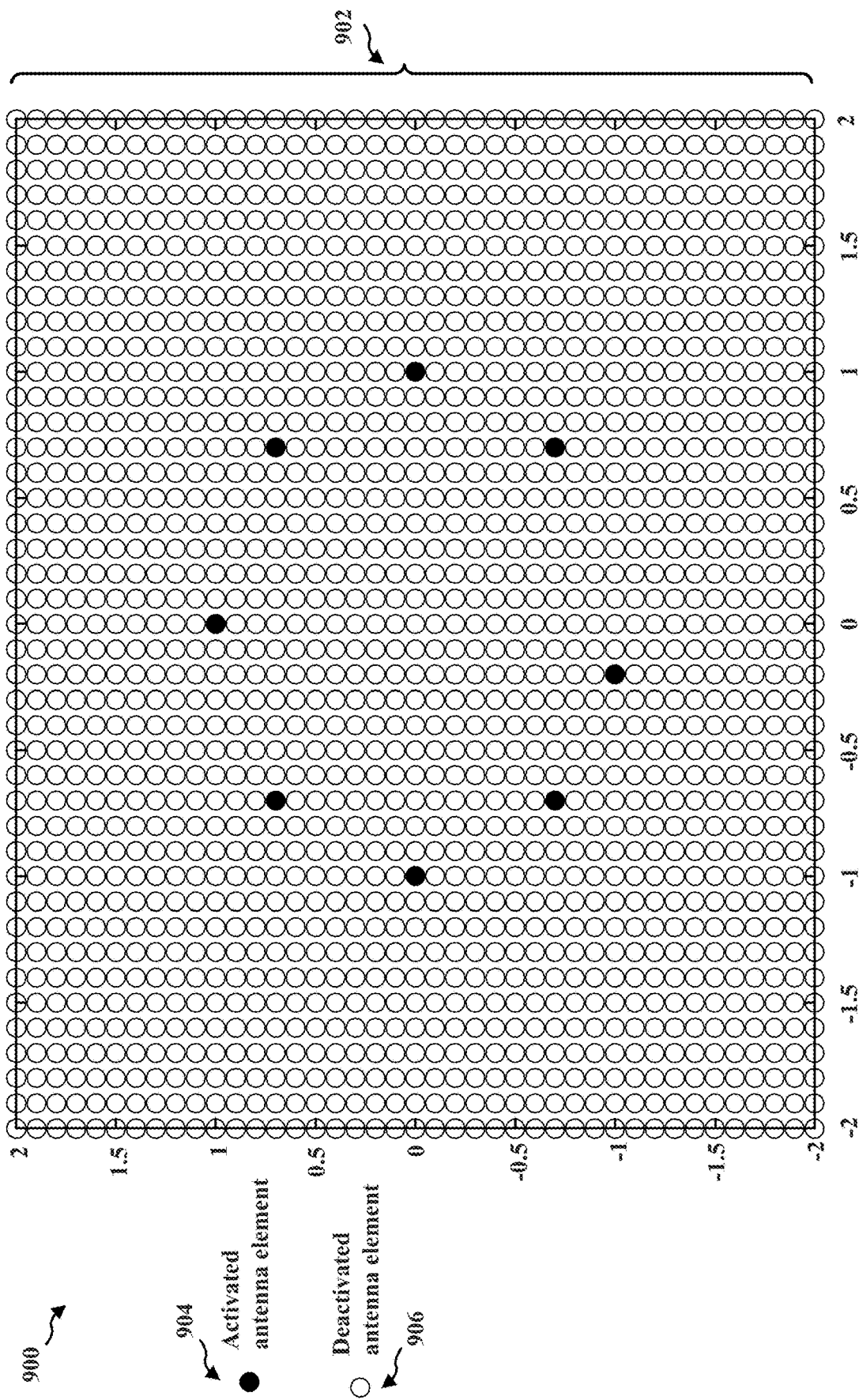
FIG. 9 illustrates another example implementation of an antenna array that may be used to transmit and receive an OAM transmission in accordance with aspects of the present disclosure.

FIGS. 8 and 9 illustrate example implementations of an antenna array that may be used to transmit and receive an OAM transmission. In the example of FIG. 8, an antenna array 800 includes eight antenna elements arranged in a circle. In the example of FIG. 9, an antenna array 900 includes a plurality of antenna elements 902 from which a subset of antenna elements may be activated for transmitting and receiving an OAM transmission. The antenna array 900 includes eight activated antenna elements 904 (shown as solid black circles in the example of FIG. 9) and the remaining antenna elements of the plurality of antenna elements 902 are deactivated antenna elements 906. It may be appreciated that activating a subset of the antenna elements of the antenna array 900 may be beneficial in power savings.

Although the examples of FIGS. 8 and 9 illustrate a circular pattern of activated antenna elements, it may be appreciated that other examples may employ additional or alternate patterns for receiving and transmitting OAM transmissions. Additionally, additional or alternate examples may include different quantities of activated antenna elements.

FIG. 10 illustrates an example of an antenna array 1000 including a plurality of antenna elements 1002. In the example, the antenna array 1000 includes a subset of activated antenna elements 1004 and a subset of deactivated antenna elements 1006. As shown in FIG. 10, the antenna array 1000 includes eight example activated antenna elements 1004 arranged in a circular pattern.

As described above, OAM transmissions may be sensitive to spatial misalignment between the transmitter and the receiver. For example, in FIG. 10, a spatial misalignment between the transmitter and the receiver may cause an OAM transmission to be received at antenna elements 1008 corresponding to received misaligned OAM beams.

Aspects disclosed herein facilitate a transmitting device to periodically transmit misalignment tracking reference signals that are received by the receiving device. The receiving device may use the misalignment tracking reference signals to scan over the receiver antenna elements to find any misalignment between the transmitter and the receiver. In some examples, the misalignment tracking reference signals may have one or more repetitions to increase the chances of the receiving device scanning the receiver antenna elements. The misalignment tracking reference signals enable the receiving device to estimate off-axis, non-parallel, and/or rotational misalignments.

Referring again to the example of FIG. 10, the receiving device may determine the locations of the antenna elements 1008 corresponding to the received misaligned OAM beams. The receiving device may use the determined locations to measure the off-axis, non-parallel, and/or rotational misalignment between the transmitter and the receiver. Based on the determined misalignment, the receiving device may adjust reception of a subsequent OAM transmission. For example, the receiving device may determine to activate the antenna elements 1008 corresponding to the received misaligned OAM beams. In some examples, the receiving device may mechanically move the antenna array 1000 so that the activated antenna elements 1004 align with the transmitter to correct the misalignment. In some examples, the receiver may mechanically move the antenna array 1000 and activate a second subset of antenna elements to correct the misalignment between the transmitter and the receiver.

In an aspect, OAM beams with different topological charges (different indexes m) are orthogonal to each other. This allows for the different OAM beams to be separated and decoded efficiently. Moreover, OAM beams can be used to achieve MIMO (e.g., transmit multiple signals at the same time) provided that all relevant orders of m are captured by an OAM-MIMO receiver. Each order of m may carry a different stream. Inter-stream orthogonality may be limited by alignment.

In an aspect, for $|m|>0$, OAM beams have a singularity (a zero-intensity region) at their center. The OAM-MIMO receiver may compare the phases around the singularity to detect m. OAM beams may be generated in an analog or digital manner In one example, the OAM beams may be generated using discrete elements by sampling an orbital phase at a high enough angular rate to avoid phase aliasing. As described with respect to Equation 2 above, the number of elements (nelem) may be greater than or equal to $2|m|+1$. That is, nelem $\geq 2|m|+1$. For example, if $-1 \leq m \leq 1$, then nelem $\geq 3$. In another example, if $-3 \leq m \leq 3$, then nelem $\geq 8$.

A problem associated with transmitting OAM beams/signals is that when the OAM-MIMO receiver receives the signal with any mismatch (e.g., spatial misalignment between transmitter (Tx) antenna array and receiver (Rx) antenna array), then the OAM-MIMO receiver will have difficulty separating and decoding orthogonal OAM beams. OAM beams become less orthogonal when they are received with spatial misalignment. Moreover, if excessive spatial misalignment is present, then the phase pattern of the OAM beam/waveform may be affected and the OAM-MIMO receiver may not receive any signal at all. For example, if the OAM-MIMO receiver attempts to receive an OAM beam with a desired helical mode or index (e.g., m=+1), then the receiver attempts to detect an OAM beam having an expected phase pattern corresponding to the desired index. All other OAM beams having different phase patterns (different indexes) will be ignored since the OAM beams are orthogonal. As a result, the OAM beam with the desired index (e.g., m=+1) may be isolated to be decoded. However, if a spatial misalignment is present, then the OAM beam corresponding to the desired index may not have the phase pattern expected by the OAM-MIMO receiver. Thus, the OAM-MIMO receiver may not be able to detect and/or decode the OAM beam corresponding to the desired index if the OAM-MIMO receiver does not recognize the OAM beam's phase pattern associated with the desired index due to the spatial misalignment. Small spatial misalignment degrades spectral efficiency. As the spatial misalignment between the Tx antenna array and the Rx antenna array increases, spectral efficiency degrades by factors. Hence, aspects of the disclosure provide techniques for decreasing and/or eliminating the spatial misalignment to increase the efficiency of OAM beam communication.

Misalignments between a transmitter (Tx) and a receiver (Rx) may be due to off-axis mismatch, non-parallel mismatch, and/or rotational mismatch. For example, an off-axis misalignment may be present if the Tx antenna array and the Rx antenna array are parallel to each other but are misaligned in a horizontal and/or vertical direction. A non-parallel misalignment may be present if the Tx antenna array is not parallel to the Rx antenna array. This may lead to the OAM beam being elliptical in shape rather than circular. A rotational misalignment may be present if the Tx antenna array and/or the Rx antenna array is rotated with respect to the other. Ideally, the Tx and Rx antenna arrays are rotationally positioned with respect to each other such that signal energy is at a maximum when the OAM beam is received.

In an aspect, a mismatch may be corrected at a receiver side (e.g., UE side) alone, but may be costly and inefficient to do so. For example, correction at the receiver side may require the presence and use of additional antennas different from the antennas used to receive the OAM beam affected by the misalignment. Such an antenna array design including the additional receiver antennas may be expensive to implement, decrease efficiency, and reduce cost-effectiveness. Accordingly, a more efficient technique may be to correct the mismatch at both the transmitter side (e.g., gNB) and the receiver side. To correct at both the transmitter side and the receiver side, mismatches may need to be estimated by the receiver side and reported to the transmitter side for optimized performance In an aspect, the receiver side (e.g., UE) may first attempt to correct the spatial misalignment as best it can (one-sided correction) before reporting the misalignment to the transmitter side (e.g., gNB). In some aspects, after determining the misalignment, the receiver side may attempt to correct the misalignment based on the misalignment being less than or equal to a threshold amount. In one example, if the misalignment is greater than the threshold amount, the receiver side may not be able to correct the misalignment. Accordingly, the receiver side may send a report regarding the misalignment to the transmitter side (e.g., when the misalignment is greater than the threshold amount) to prompt the transmitter side to correct the misalignment. The report to the transmitter side may include adjusted misalignment information to reflect the receiver side's best attempt at correction so that the transmitter side's attempt to correct will be bolstered by the receiver side's initial attempt. In an aspect, the transmitter side and the receiver side may exchange one or more messages during a negotiation process to achieve an optimized correction result.

In an aspect, an OAM waveform is sensitive to the alignment of receiver (Rx) and transmitter (Tx) antenna elements. As such, the present disclosure is directed to defining a misalignment report that will allow for the correction of the misalignment of the antenna array at the transmitter side (e.g., gNB) with respect to the antenna array at the receiver side (e.g., UE) when using the OAM waveform, and therefore, improve performance and robustness. For example, the receiver side may determine a spatial misalignment of the OAM waveform received from the transmitter side and report the spatial misalignment to the transmitter side. Once both the receiver side and the transmitter side learn of the spatial misalignment, the two sides may perform procedures to correct the misalignment and optimize performance An optional implementation for communicating the OAM waveform is to use a Uniform Circular Array (UCA). Notably, misalignment correction is not limited to OAM beam/waveform communication between a gNB and a UE (gNB-to-UE communication). Aspects of the disclosure also apply to spatial misalignment correction between other entities communicating OAM beams/waveforms, such as communications involving a gNB to a gNB (gNB-to-gNB communication) or two data centers communicating via OAM beams, communications involving Integrated Access Backhaul (IAB) entities, communications involving sidelink entities, etc.

Figure 11A:
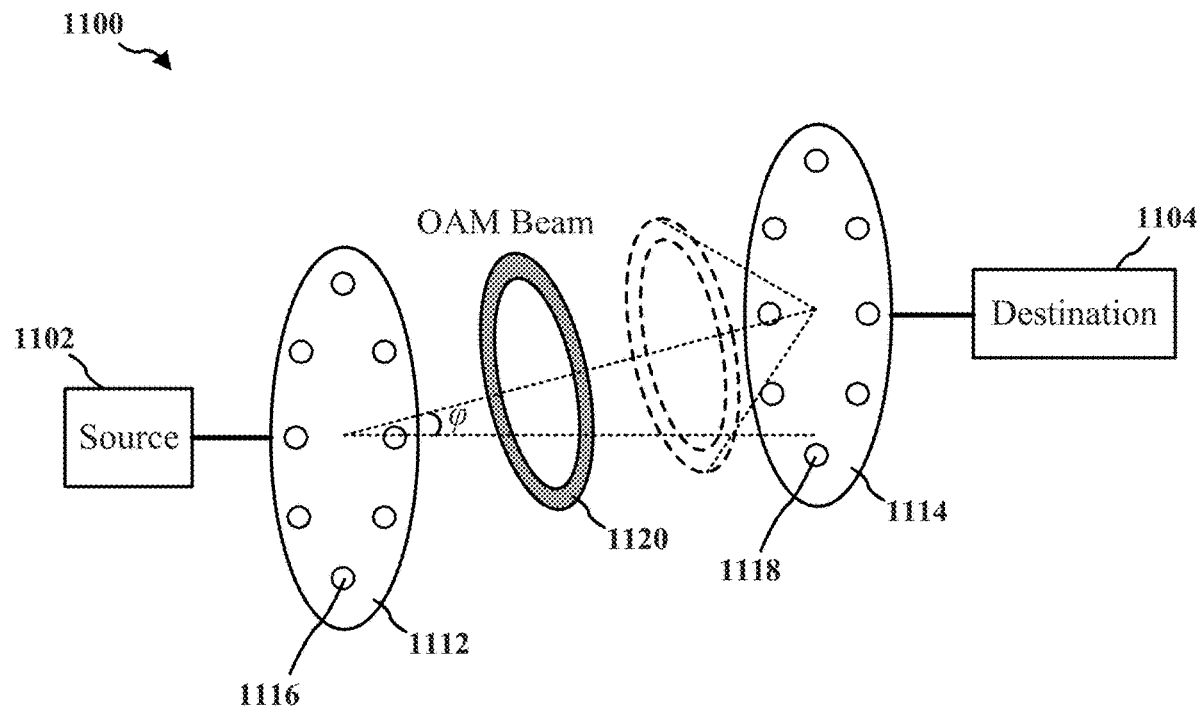
FIG. 11A is a diagram illustrating off-axis misalignment between a transmitting device (e.g., source) and a receiving device (e.g., destination) including misalignment correction in accordance with aspects of the present disclosure.
Figure 11B:
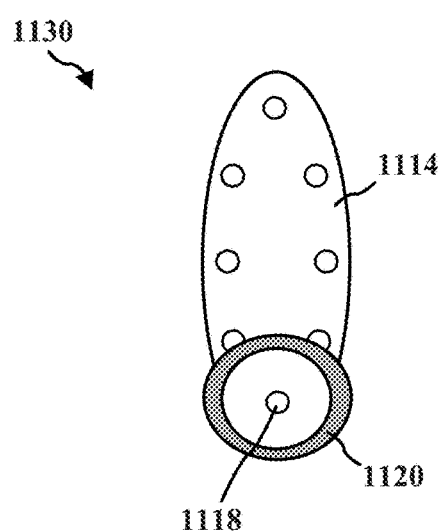
FIG. 11B is a diagram illustrating a front perspective view of a destination antenna array of the receiving device in accordance with aspects of the present disclosure.
Figure 11C:
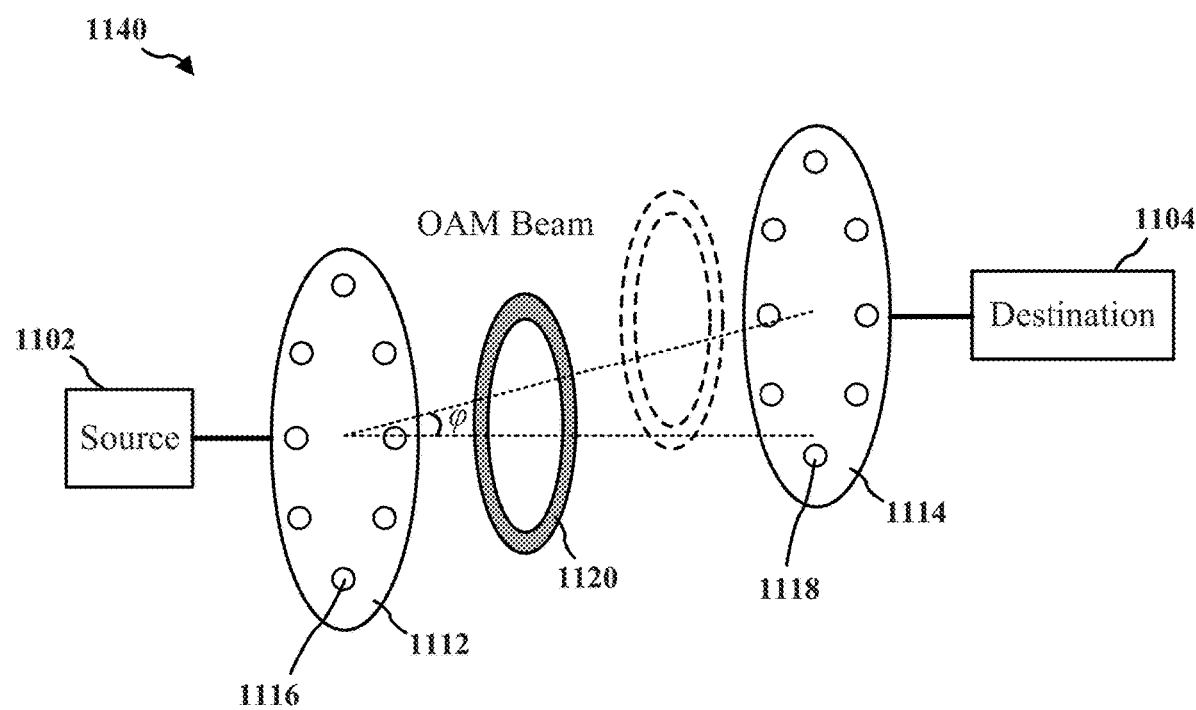
FIG. 11C is a diagram illustrating off-axis misalignment between a transmitting device (e.g., source) and a receiving device (e.g., destination) without misalignment correction in accordance with aspects of the present disclosure.

FIG. 11A is a diagram 1100 illustrating off-axis misalignment between a transmitting device (e.g., source, gNB, etc.) 1102 and a receiving device (e.g., destination, UE, etc.) 1104 including misalignment correction (e.g., via beam steering of an OAM waveform). FIG. 11B is a diagram 1130 illustrating a front perspective view of a destination antenna array 1114 of the receiving device 1104. FIG. 11C is a diagram 1140 illustrating off-axis misalignment between a transmitting device (e.g., source, gNB, etc.) 1102 and a receiving device (e.g., destination, UE, etc.) 1104 without misalignment correction. An off-axis misalignment may be present if a source antenna array 1112 and a destination antenna array 1114 are parallel to each other but are misaligned in a horizontal and/or vertical direction. Here, an OAM beam/waveform 1120 from the source antenna array 1112 (including one or more antenna elements 1116) is not on the same axis as the destination antenna array 1114 (including one or more antenna elements 1118). This results in the OAM beam/waveform 1120 being vertically misaligned (as shown at the diagram 1130 of FIG. 11B). An angle yo represents an angular difference between a vertical axial position of the source antenna array 1112 and a vertical axial position of the destination antenna array 1114. Accordingly, the source 1102 and/or the destination 1104 may need to perform beam steering to optimize spectral efficiency.

In an aspect, the off-axis (e.g., vertical and/or horizontal) misalignment of the OAM beam/waveform 1120 between the source 1102 and the destination 1104 may be determined based on data and/or demodulation reference signals (DMRS) received at the destination 1104 using a large Uniform Rectangular Array (URA). Alternatively, the off-axis misalignment may be determined based on using a Uniform Circular Array (UCA) and a waveform shape (e.g., from a measured reference signal receive power (RSRP), signal-to-interference-plus-noise ratio (SINR), etc.). The off-axis misalignment may also be determined via an OAM beam management procedure.

Figure 12A:
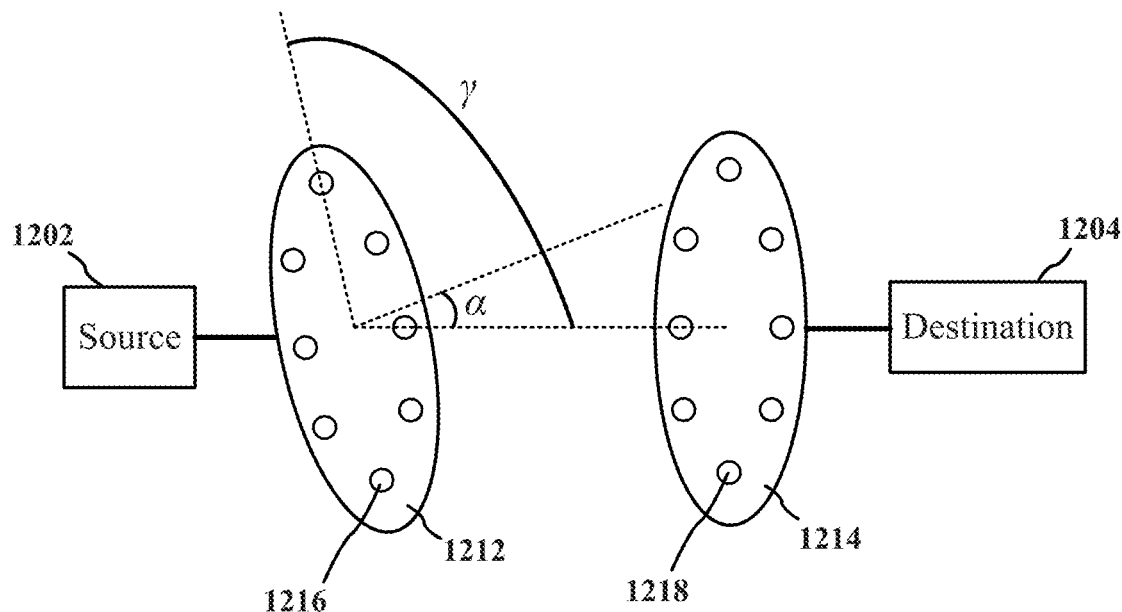
FIG. 12A is a diagram illustrating non-parallel misalignment between a transmitting device (e.g., source) and a receiving device (e.g., destination) in accordance with aspects of the present disclosure.
Figure 12B:
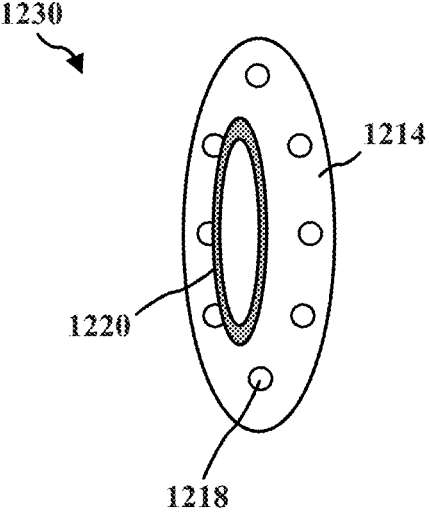
FIG. 12B is a diagram illustrating a front perspective view of a destination antenna array of the receiving device in accordance with aspects of the present disclosure.

FIG. 12A is a diagram 1200 illustrating non-parallel misalignment between a transmitting device (e.g., source, gNB, etc.) 1202 and a receiving device (e.g., destination, UE, etc.) 1204. FIG. 12B is a diagram illustrating a front perspective view of a destination antenna array 1214 of the receiving device 1204. A non-parallel misalignment may be present if a source antenna array 1212 is not parallel to a destination antenna array 1214. Here, an OAM beam/waveform 1220 from the source antenna array 1212 is on the same axis but not parallel to the destination antenna array 1214 (including one or more antenna elements 1218). An angle α represents an angular difference between a horizontal planar position of the source antenna array 1212 and a horizontal planar position of the destination antenna array 1214. An angle γ represents an angular difference between a vertical planar position of the source antenna array 1212 and a vertical planar position of the destination antenna array 1214. As shown at diagram 1230 of FIG. 12B, this may lead to the OAM beam/waveform 1220 having an elliptical shape rather than a circular shape (such as the OAM beam/waveform 1120 of FIG. 11B).

In an aspect, the non-parallel misalignment of the OAM beam/waveform 1220 between the source 1202 and the destination 1204 may be determined based on data and/or DMRS received at the destination 1204 using URA. Alternatively, the non-parallel misalignment may be determined based on using UCA and waveform squeezing (e.g., from a measured RSRP, SINR, etc.). For example, waveform squeezing may refer to a narrowing and/or broadening of the OAM waveform due to the non-parallel misalignment. The non-parallel misalignment may also be determined via an OAM beam management procedure.

Figure 13:
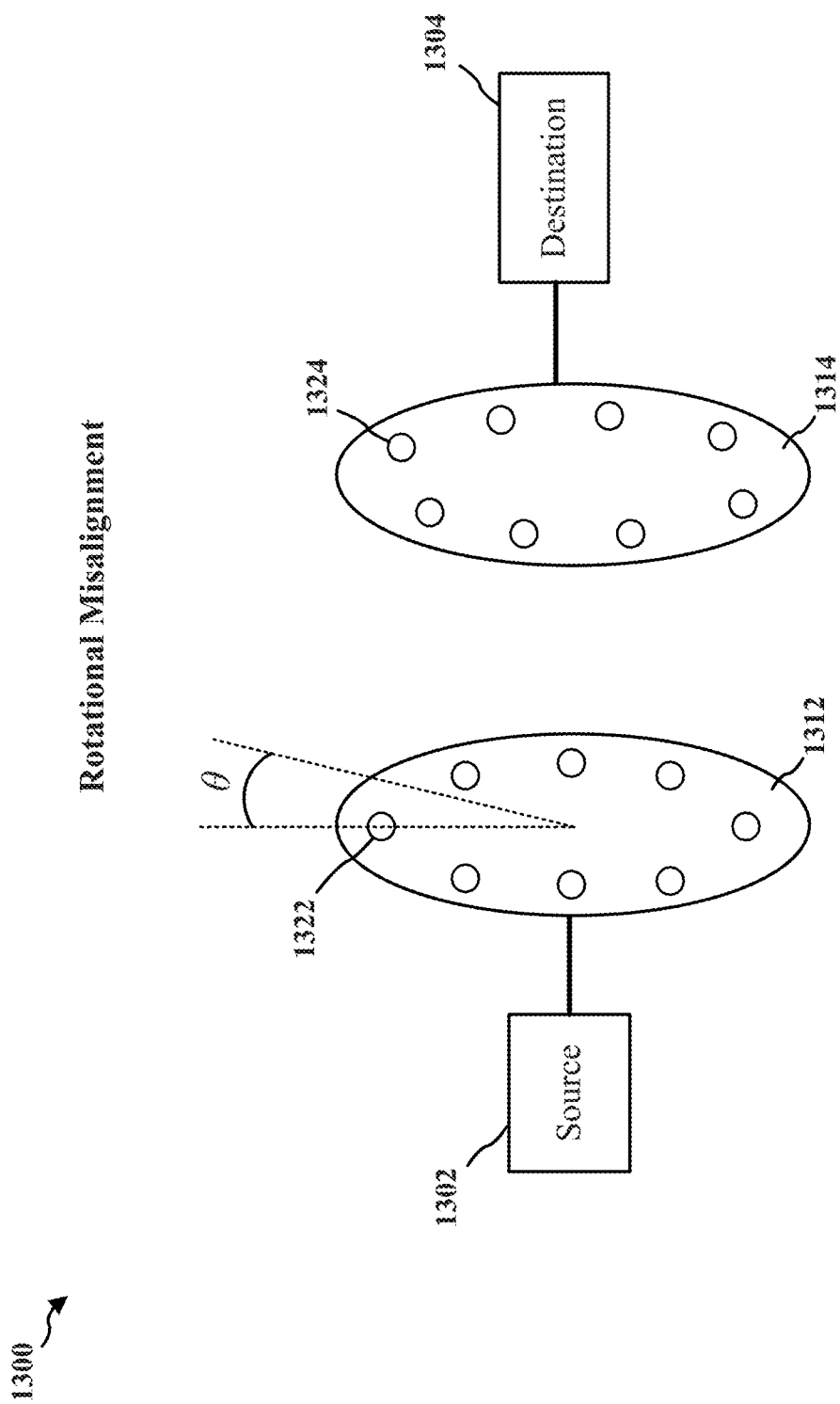
FIG. 13 is a diagram illustrating rotational misalignment between a transmitting device (e.g., source) and a receiving device (e.g., destination) in accordance with aspects of the present disclosure.

FIG. 13 is a diagram 1300 illustrating rotational misalignment between a transmitting device (e.g., source) 1302 and a receiving device (e.g., destination) 1304. A rotational misalignment may be present if a source antenna array 1312 is rotated with respect to a destination antenna array 1314, and vice versa. For example, rotational misalignment occurs if one or more antennas 1322 of the source antenna array 1312 are rotated to a position that is not aligned with one or more corresponding antennas 1324 of the destination antenna array 1314. As shown in FIG. 13, an angle θ represents an angular difference between a rotational position of an antenna of the source antenna array 1312 and a rotational position of a corresponding antenna of the destination antenna array 1314. In an aspect, the source antenna array 1312 may not have the same number of antennas as the destination antenna array 1314. As such, the rotational misalignment between the source antenna array 1312 and the destination antenna array 1314 may be based on an angular difference between the rotational position of the source antenna array 1312 (and/or the destination antenna array 1314) and an ideal antenna array position that will yield maximum spectral efficiency (highest signal energy).

Figure 14:
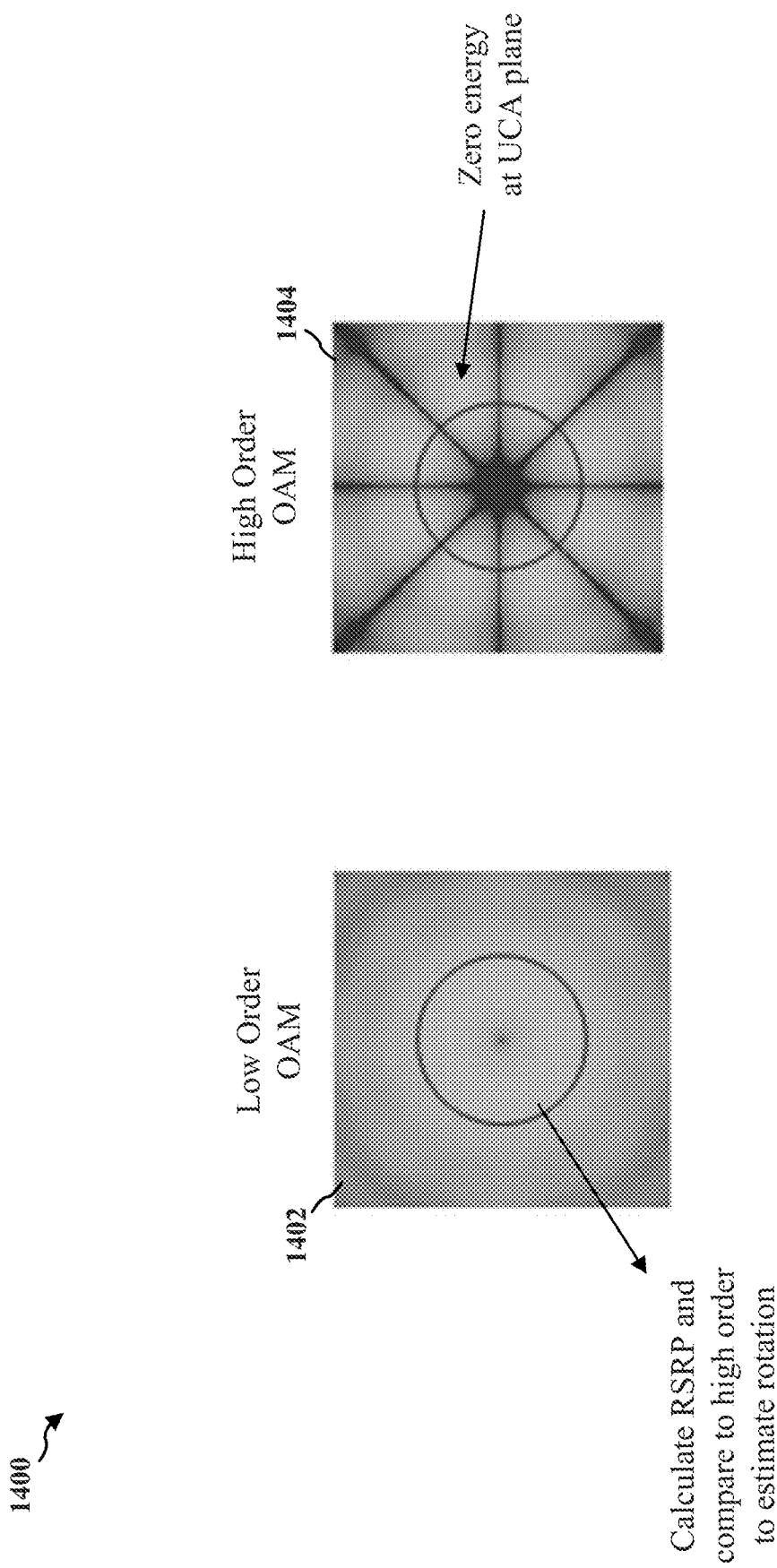
FIG. 14 is a diagram illustrating a low order OAM waveform and a high order OAM waveform in accordance with aspects of the present disclosure.

FIG. 14 is a diagram 1400 illustrating a low order OAM waveform 1402 and a high order OAM waveform 1404. Low order OAM waveforms have different wave patterns from high order OAM waveforms, and thus, have different null locations. Accordingly, the rotational misalignment of an OAM waveform between the transmitting device 1302 and the receiving device 1304 can be determined based on knowing an order of the OAM waveform and where the null locations of the waveform should theoretically be. For example, referring to FIG. 14, the rotational misalignment of the low order OAM waveform 1402 may be determined by measuring the RSRP of different beams at each antenna and estimate the rotation by comparing measured null locations to the theoretical null locations. This may be applicable to other misalignments as well due to different OAM waveform orders having different patterns. The rotational misalignment may also be determined via an OAM beam management procedure that scans the rotations.

In an aspect, misalignments may be common for all OAM beams communicated between the transmitting device and the receiving device. Thus, the misalignments may be corrected without degrading the orthogonality of the beams. A misalignment report can be defined in Cartesian coordinates, polar coordinates, or any other type of coordinate system.

In an aspect, a method of generating a misalignment report may be as follows. First, a receiving device (e.g., UE) may estimate an angle of arrival of a beam transmitted from a transmitting device (e.g., base station or gNB). For example, the receiving device may estimate the beam angle of arrival by searching in a direction having a highest beam power using OAM beam steering of the antenna array (two-dimensional search) during a P2 or P3 beam refinement procedure. Notably, reporting the estimated beam angle of arrival to the transmitting device may not be obligatory since the transmitting device is already aware of the transmitted beam's directionality. Once the transmitting device beam angle is known, all misalignments can be defined relative to the coordinates of the beam angle. Relative coordinates can be defined according to a Cartesian coordinate system, polar coordinate system, geographic coordinate system, etc.

In an aspect, referring to FIGS. 11A, 11B and 11C, for an off-axis misalignment, the receiving device 1104 may report a distance to correct the transmitted beam's directionality in the X-axis and/or the Y-axis in units of millimeters. Here, the X-axis may represent the axis parallel to the beam direction and the Y-axis may represent the axis orthogonal to the beam direction. Referring to FIGS. 12A and 12B, for a non-parallel misalignment, the receiving device 1204 may report angles a and y to correct the transmitted beam's directionality in units of degrees. Here, a may represent an angle parallel to the beam's direction and y may represent an angle orthogonal to the beam's direction. Referring to FIG. 13, for a rotational misalignment, the receiving device 1304 may report a rotational angle θ to correct the transmitted beam's rotational position in units of degrees. Here, the direction to correct may be predefined as clockwise or anti-clockwise.

In an aspect, a receiving device may transmit the misalignment report to the transmitting device via a radio resource control (RRC) message, a medium access control (MAC) control element (CE), uplink control information (UCI), a physical uplink control channel (PUCCH), or any combination thereof. For example, the misalignment report can be carried in a channel state information (CSI) report configuration message. The report can be periodic, aperiodic, or triggered by the transmitting device. Once the transmitting device receives the misalignment report, the transmitting device may generate an adjusted OAM waveform based on the report, and thereafter, send the adjusted OAM waveform to the receiving device. The adjusted OAM waveform is sent having a corrected spatial alignment with respect to the receiving device.

Figure 15:
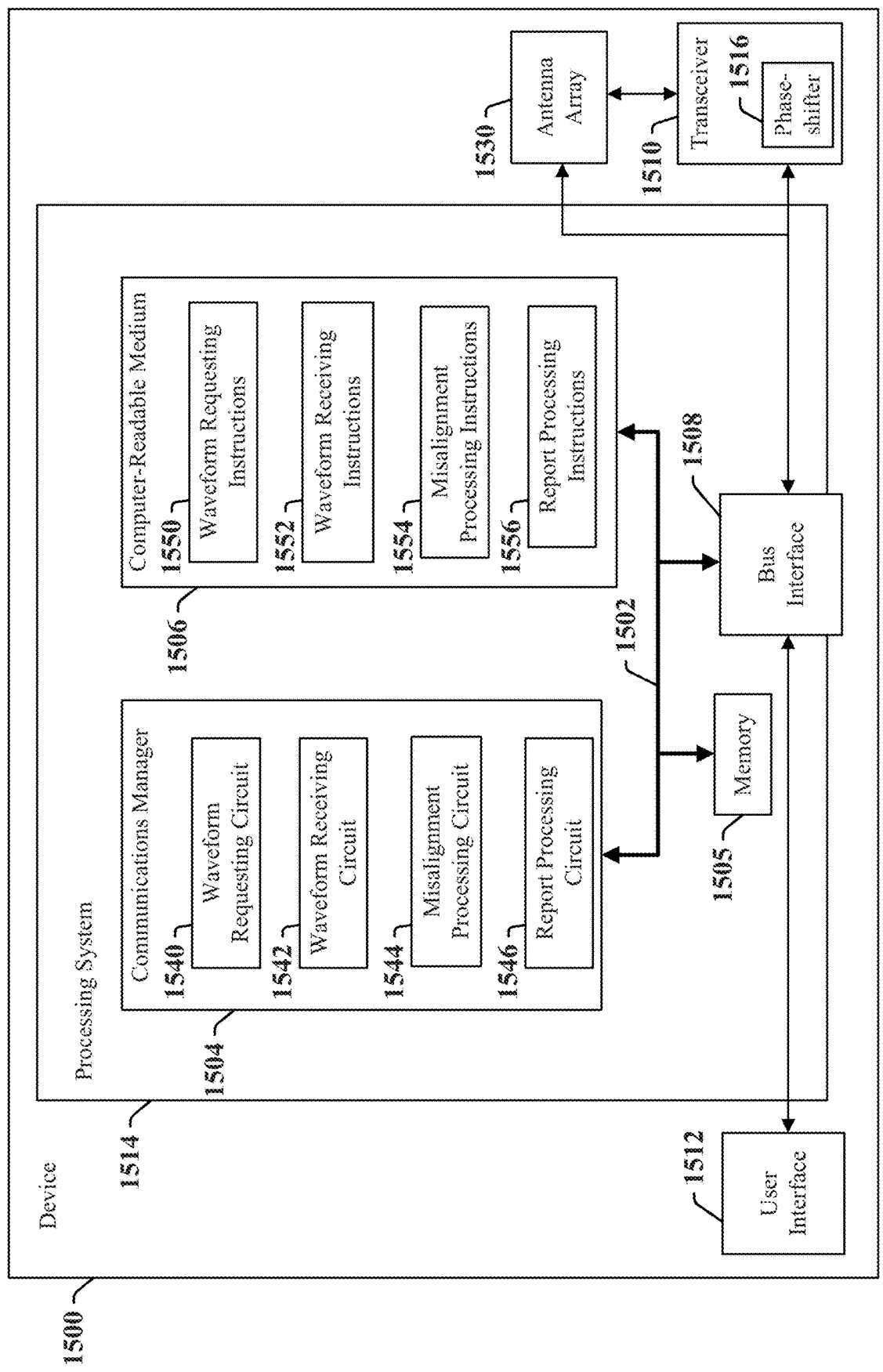
FIG. 15 is a block diagram illustrating an example of a hardware implementation for an exemplary device employing a processing system in accordance with aspects of the present disclosure.

FIG. 15 is a block diagram illustrating an example of a hardware implementation for an exemplary device 1500 employing a processing system 1514. For example, the device 1500 may be a receiving device or UE, as illustrated in any one or more of FIGS. 1, 3, 4A-4C, 6, and 11-13. The device 1500 may be implemented with a processing system 1514 that includes one or more processors 1504 (e.g., communications manager). Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the device 1500 may be configured to perform any one or more of the functions described herein. That is, the processor 1504, as utilized in a device 1500, may include the UE communications manager 198/398 and used to implement any one or more of the processes and procedures described below and illustrated in FIG. 16.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a transmission medium. In some examples, the transceiver 1510 may include a phase-shifter 1516 for digital and/or analog beamforming via one or more antenna array(s) 1530. Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects of the disclosure, the processor 1504 (e.g., UE communications manager 198/398) may include waveform requesting circuitry 1540 configured for various functions, including, for example, sending a request to a second device to transmit an OAM waveform to a first device. For example, the waveform requesting circuitry 1540 may be configured to implement one or more of the functions described below in relation to FIG. 16, including, e.g., block 1602. The processor 1504 may also include waveform receiving circuitry 1542 configured for various functions, including, for example, receiving, at the first device, the OAM waveform from the second device, wherein the OAM waveform is received having a spatial misalignment with respect to the second device. For example, the waveform receiving circuitry 1542 may be configured to implement one or more of the functions described below in relation to FIG. 16, including, e.g., block 1604. The processor 1504 may also include misalignment processing circuitry 1544 configured for various functions, including, for example, determining the spatial misalignment, wherein the spatial misalignment comprises an off-axis misalignment, a non-parallel misalignment, and/or a rotational misalignment, determining spatial coordinates for correcting the spatial misalignment and/or determining one or more channel measurements of the OAM waveform, and adjusting reception of the OAM waveform to correct the determined spatial misalignment. For example, the misalignment processing circuitry 1544 may be configured to implement one or more of the functions described below in relation to FIG. 16, including, e.g., blocks 1606 and 1608. The processor 1504 may also include report processing circuitry 1546 configured for various functions, including, for example, generating a report based on the spatial misalignment, wherein the report includes the spatial coordinates for correcting the spatial misalignment and/or the one or more channel measurements of the OAM waveform, and sending, from the first device to the second device, the report based on the spatial misalignment. For example, the report processing circuitry 1546 may be configured to implement one or more of the functions described below in relation to FIG. 16, including blocks 1610 and 1612. Additionally, the waveform receiving circuitry 1542 may be configured for receiving, at the first device, an adjusted OAM waveform from the second device, wherein the adjusted OAM waveform is received having a corrected spatial alignment with respect to the second device based on the report. For example, the waveform receiving circuitry 1542 may be configured to implement one or more of the functions described below in relation to FIG. 16, including, e.g., block 1614.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1506 may include waveform requesting instructions 1550 configured for various functions, including, for example, sending a request to a second device to transmit an OAM waveform to a first device. For example, the waveform requesting instructions 1550 may be configured to implement one or more of the functions described below in relation to FIG. 16, including, e.g., block 1602. The computer-readable storage medium 1506 may also include waveform receiving instructions 1552 configured for various functions, including, for example, receiving, at the first device, the OAM waveform from the second device, wherein the OAM waveform is received having a spatial misalignment with respect to the second device. For example, the waveform receiving instructions 1552 may be configured to implement one or more of the functions described below in relation to FIG. 16, including, e.g., block 1604. The computer-readable storage medium 1506 may also include misalignment processing instructions 1554 configured for various functions, including, for example, determining the spatial misalignment, wherein the spatial misalignment comprises an off-axis misalignment, a non-parallel misalignment, and/or a rotational misalignment, determining spatial coordinates for correcting the spatial misalignment and/or determining one or more channel measurements of the OAM waveform, and adjusting reception of the OAM waveform to correct the determined spatial misalignment. For example, the misalignment processing instructions 1554 may be configured to implement one or more of the functions described below in relation to FIG. 16, including, e.g., blocks 1606 and 1608. The computer-readable storage medium 1506 may also include report processing instructions 1556 configured for various functions, including, for example, generating a report based on the spatial misalignment, wherein the report includes the spatial coordinates for correcting the spatial misalignment and/or the one or more channel measurements of the OAM waveform, and sending, from the first device to the second device, the report based on the spatial misalignment. For example, the report processing instructions 1556 may be configured to implement one or more of the functions described below in relation to FIG. 16, including blocks 1610 and 1612. Additionally, the waveform receiving instructions 1552 may be configured for receiving, at the first device, an adjusted OAM waveform from the second device, wherein the adjusted OAM waveform is received having a corrected spatial alignment with respect to the second device based on the report. For example, the waveform receiving instructions 1552 may be configured to implement one or more of the functions described below in relation to FIG. 16, including, e.g., block 1614.

Figure 16:
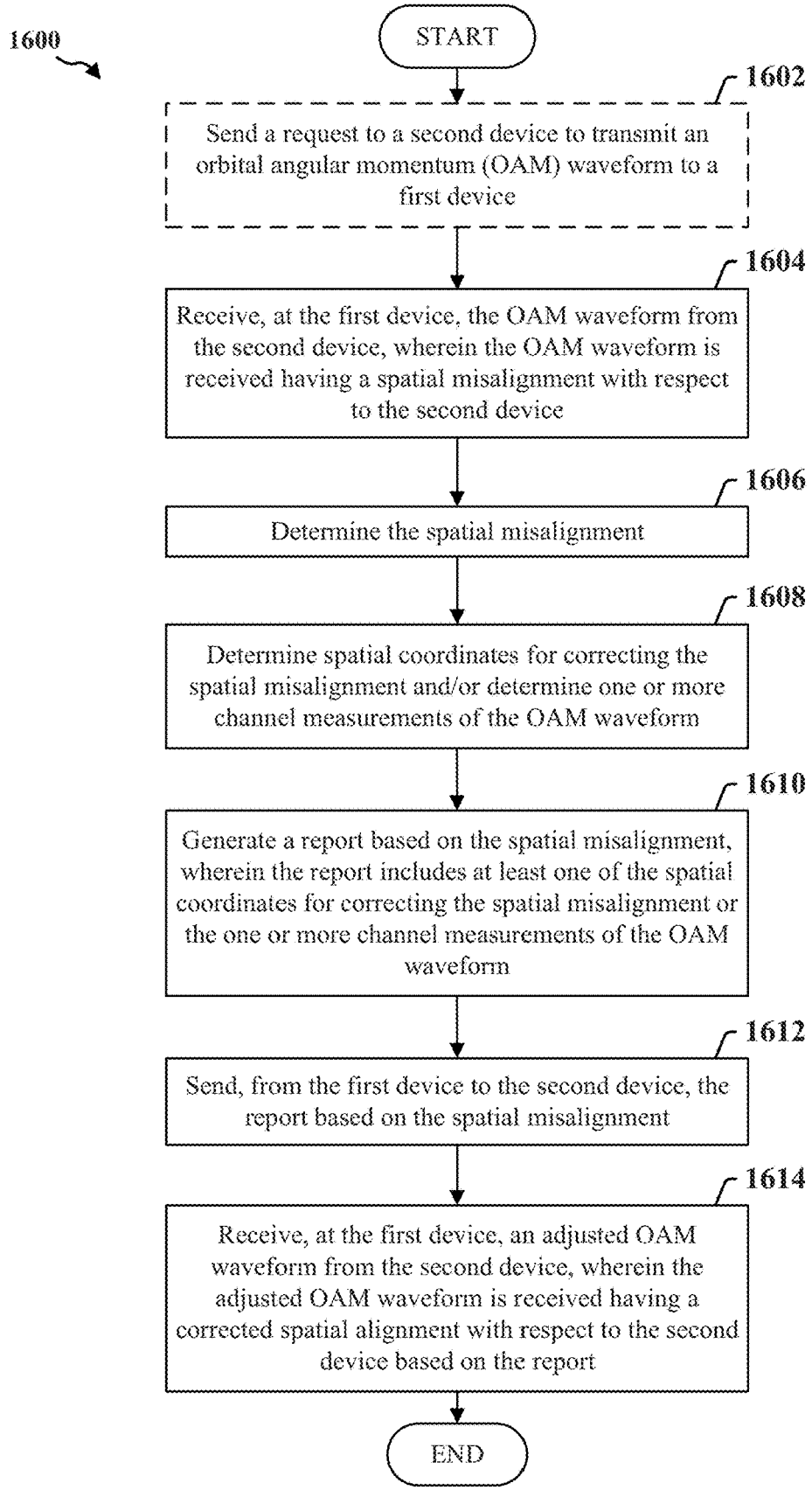
FIG. 16 is a flow chart illustrating an exemplary process for communicating an orbital angular momentum (OAM) waveform from a second device to a first device in accordance with aspects of the present disclosure.

FIG. 16 is a flow chart illustrating an exemplary process 1600 for communicating an orbital angular momentum (OAM) waveform from a second device (e.g., transmitting device) to a first device (e.g., receiving device) in accordance with aspects of the present disclosure. As described below, some or all illustrated features may be omitted in a particular implementation within the scope of the present disclosure, and some illustrated features may not be required for implementation of all aspects. In some examples, the process 1600 may be carried out by the device 1500 illustrated in FIG. 15, which may be a first device, receiving device, or UE, as illustrated in any one or more of FIGS. 1, 3, 4A-4C, 6, and 11-13. In some examples, the process 1600 may be carried out by any suitable apparatus or means for carrying out the functions or algorithm described below.

At block 1602, the first device may send a request to a second device to transmit an orbital angular momentum (OAM) waveform to the first device. At block 1604, the first device may receive the OAM waveform from the second device. The OAM waveform may be received having a spatial misalignment with respect to the second device.

At block 1606, the first device may determine the spatial misalignment. In an aspect, the spatial misalignment includes an off-axis misalignment, a non-parallel misalignment, and/or a rotational misalignment. For example, the first device may determine the off-axis misalignment and/or the non-parallel misalignment by first measuring a received signal power of the OAM waveform (e.g., using a Uniform Rectangular Array (URA) or Uniform Circular Array (UCA)). Thereafter, the first device may determine a shape of the OAM waveform based on the received signal power and determine the off-axis misalignment and/or the non-parallel misalignment based on the received signal power and the shape of the OAM waveform.

In another example, the first device may determine the rotational misalignment by determining an OAM order of the OAM waveform, determining an expected beam pattern of the OAM waveform based on the OAM order, and measuring a received signal power of different beams of the OAM waveform. Thereafter, the first device may compare the expected beam pattern to the measured received signal power of the different beams and determine the rotational misalignment based on the comparison.

At block 1608, the first device may determine spatial coordinates for correcting the spatial misalignment (e.g., off-axis misalignment, non-parallel misalignment, and/or rotational misalignment). For example, the first device may determine the spatial coordinates by measuring a beam angle of arrival of the OAM waveform from the second device, determining spatial coordinates of the beam angle of arrival, and determining the spatial coordinates for correcting the spatial misalignment (e.g., off-axis misalignment, non-parallel misalignment, and/or rotational misalignment) relative to the spatial coordinates of the beam angle of arrival. At block 1608, the first device may additionally or alternatively, determine the one or more channel measurements of the OAM waveform. The one or more channel measurements may include a received signal power of the OAM waveform and/or a phase of the OAM waveform. Moreover, at block 1608, the first device may adjust reception of the OAM waveform to correct the spatial misalignment determined at block 1606. For example, based on the determined spatial coordinates and/or the determined channel measurements of the OAM waveform, the receiving device may adjust reception via beam steering to correct the misalignment, e.g., by activating antenna elements corresponding to the received misaligned OAM waveform, mechanically moving an antenna array so that activated antenna elements align with the second device to correct the misalignment, and/or mechanically moving an antenna array and activating a second subset of antenna elements to correct the misalignment between the second device and the first device. The receiving device may also enable beam steering by applying phase shifters.

At block 1610, the first device may generate a report based on the spatial misalignment. The report may include the spatial coordinates for correcting the spatial misalignment and/or the one or more channel measurements of the OAM waveform. In an aspect, the first device may attempt to correct the spatial misalignment (e.g., by adjusting reception of the OAM waveform at block 1608) as best it can before sending the report to the second device. For example, an optimal attempt may result in zero misalignment residual (depending on the misalignment case as not all misalignments can have zero residual). Thus, the report may include adjusted spatial coordinates for correcting the spatial misalignment reflecting the first device's attempt at correction. As such, any attempt by the second device to correct the spatial misalignment may be bolstered by the first device's initial attempt.

At block 1612, the first device may send to the second device the report based on the spatial misalignment. In an aspect, the first device may send the report via a radio resource control (RRC) message, a medium access control (MAC) control element (CE), and/or a physical layer control message. Moreover, the physical layer control message may include uplink control information (UCI). In some aspects, after determining the misalignment (at block 1606), the first device may attempt to correct the spatial misalignment based on the spatial misalignment being less than or equal to a threshold amount. If the spatial misalignment is greater than the threshold amount, the first device may not be able to optimally correct the misalignment or perform any misalignment correction at all. Accordingly, the first device may send the report to the second device when the misalignment is greater than the threshold amount to prompt the second device to correct the misalignment.

At block 1614, the first device may receive an adjusted OAM waveform from the second device. The adjusted OAM waveform may be received having a corrected spatial alignment with respect to the second device based on the report.

In one configuration, the device 1500 (e.g., first device or receiving device) for wireless communication includes means for sending (e.g., waveform requesting circuitry 1540, transceiver 1510, and/or antenna array 1530) a request to a second device to transmit an orbital angular momentum (OAM) waveform to a first device, means for receiving (e.g., waveform receiving circuitry 1542, transceiver 1510, and/or antenna array 1530), at the first device, the OAM waveform from the second device, wherein the OAM waveform is received having a spatial misalignment with respect to the second device, means for determining the spatial misalignment (e.g., misalignment processing circuitry 1544), means for determining spatial coordinates for correcting the spatial misalignment (e.g., misalignment processing circuitry 1544), means for determining the one or more channel measurements of the OAM waveform (e.g., misalignment processing circuitry 1544), means for adjusting, at the first device, reception of the OAM waveform to correct the determined spatial misalignment (e.g., misalignment processing circuitry 1544, transceiver 1510, and/or antenna array 1530), means for generating a report based on the spatial misalignment (e.g., report processing circuitry 1546), wherein the report includes at least one of the spatial coordinates for correcting the spatial misalignment or the one or more channel measurements of the OAM waveform, means for sending (e.g., report processing circuitry 1546, transceiver 1510, and/or antenna array 1530), from the first device to the second device, the report based on the spatial misalignment, and means for receiving (e.g., waveform receiving circuitry 1542, transceiver 1510, and/or antenna array 1530), at the first device, an adjusted OAM waveform from the second device, wherein the adjusted OAM waveform is received having a corrected spatial alignment with respect to the second device based on the report. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 3, 4A-4C, 6, and 11-13 and utilizing, for example, the processes and/or algorithms described herein in relation to FIG. 16.

Figure 17:
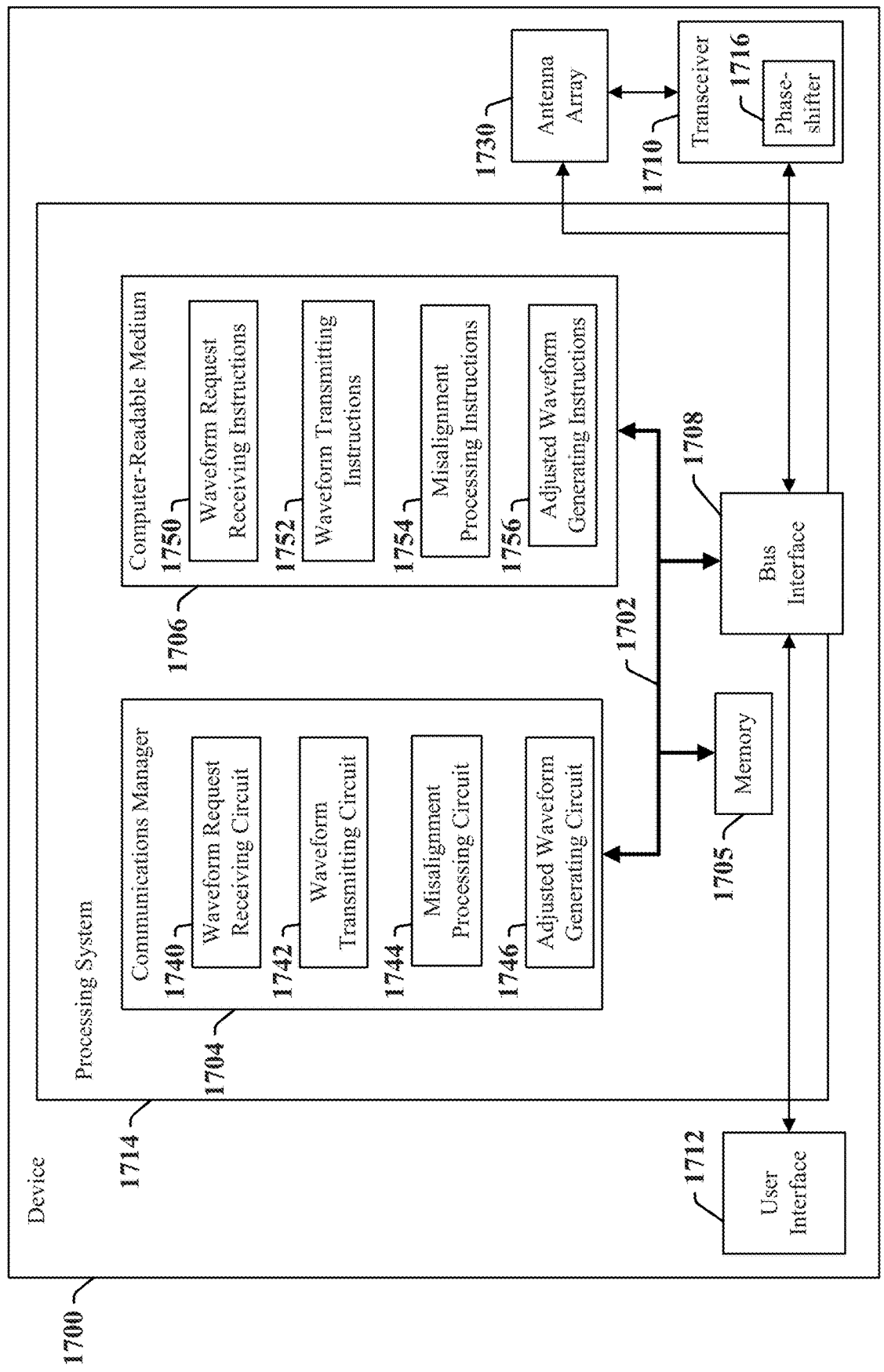
FIG. 17 is a conceptual diagram illustrating an example of a hardware implementation for an exemplary device employing a processing system in accordance with aspects of the present disclosure.

FIG. 17 is a conceptual diagram illustrating an example of a hardware implementation for an exemplary device 1700 employing a processing system 1714. In accordance with various aspects of the disclosure, an element, or any portion of an element, or any combination of elements may be implemented with a processing system 1714 that includes one or more processors 1704 (e.g., communications manager). For example, the device 1700 may be a transmitting device, base station, or gNB as illustrated in any one or more of FIGS. 1, 3, 4A-4C, 6, and 11-13.

The processing system 1714 may be substantially the same as the processing system 1514 illustrated in FIG. 15, including a bus interface 1708, a bus 1702, memory 1705, a processor 1704, and a computer-readable medium 1706. Furthermore, the device 1700 may include a user interface 1712, a transceiver 1710 (including a phase-shifter 1716), and one or more antenna arrays 1730 substantially similar to those described above in FIG. 15. The processor 1704, as utilized in a device 1700, may include the BS communications manager 199/399 and used to implement any one or more of the processes described below and illustrated in FIG. 18.

In some aspects of the disclosure, the processor 1704 (e.g., BS communications manager 199/399) may include waveform request receiving circuitry 1740 configured for various functions, including, for example, receiving a request from a first device to transmit an orbital angular momentum (OAM) waveform to the first device. For example, the waveform request receiving circuitry 1740 may be configured to implement one or more of the functions described below in relation to FIG. 18, including, e.g., block 1802. The processor 1704 may further include waveform transmitting circuitry 1742 configured for various functions, including, for example, transmitting, from a second device, the OAM waveform to the first device, wherein the OAM waveform is transmitted having a spatial misalignment with respect to the first device. For example, the waveform transmitting circuitry 1742 may be configured to implement one or more of the functions described below in relation to FIG. 18, including, e.g., block 1804. The processor 1704 may further include misalignment processing circuitry 1744 configured for various functions, including, for example, receiving, at the second device from the first device, a report based on the spatial misalignment, wherein the report includes at least one of spatial coordinates for correcting the spatial misalignment or one or more channel measurements of the OAM waveform. For example, the misalignment processing circuitry 1744 may be configured to implement one or more of the functions described below in relation to FIG. 18, including, e.g., block 1806. The processor 1704 may further include adjusted waveform generating circuitry 1746 configured for various functions, including, for example, generating an adjusted OAM waveform based on the report, the adjusted OAM waveform having a corrected spatial alignment with respect to the first device. For example, the adjusted waveform generating circuitry 1746 may be configured to implement one or more of the functions described below in relation to FIG. 18, including, e.g., block 1808. Additionally, the waveform transmitting circuitry 1742 may further be configured to transmit, from the second device to the first device, the adjusted OAM waveform having the corrected spatial alignment with respect to the first device. For example, the waveform transmitting circuitry 1742 may be configured to implement one or more of the functions described below in relation to FIG. 18, including, e.g., block 1810.

In one or more examples, the computer-readable storage medium 1706 may include waveform request receiving instructions 1750 configured for various functions, including, for example, receiving a request from a first device to transmit an orbital angular momentum (OAM) waveform to the first device. For example, the waveform request receiving instructions 1750 may be configured to implement one or more of the functions described below in relation to FIG. 18, including, e.g., block 1802. The computer-readable storage medium 1706 may further include waveform transmitting instructions 1752 configured for various functions, including, for example, transmitting, from a second device, the OAM waveform to the first device, wherein the OAM waveform is transmitted having a spatial misalignment with respect to the first device. For example, the waveform transmitting instructions 1752 may be configured to implement one or more of the functions described below in relation to FIG. 18, including, e.g., block 1804. The computer-readable storage medium 1706 may further include misalignment processing instructions 1754 configured for various functions, including, for example, receiving, at the second device from the first device, a report based on the spatial misalignment, wherein the report includes at least one of spatial coordinates for correcting the spatial misalignment or one or more channel measurements of the OAM waveform. For example, the misalignment processing instructions 1754 may be configured to implement one or more of the functions described below in relation to FIG. 18, including, e.g., block 1806. The computer-readable storage medium 1706 may further include adjusted waveform generating instructions 1756 configured for various functions, including, for example, generating an adjusted OAM waveform based on the report, the adjusted OAM waveform having a corrected spatial alignment with respect to the first device. For example, the adjusted waveform generating instructions 1756 may be configured to implement one or more of the functions described below in relation to FIG. 18, including, e.g., block 1808. Additionally, the waveform transmitting instructions 1752 may further be configured to transmit, from the second device to the first device, the adjusted OAM waveform having the corrected spatial alignment with respect to the first device. For example, the waveform transmitting instructions 1752 may be configured to implement one or more of the functions described below in relation to FIG. 18, including, e.g., block 1810.

Figure 18:
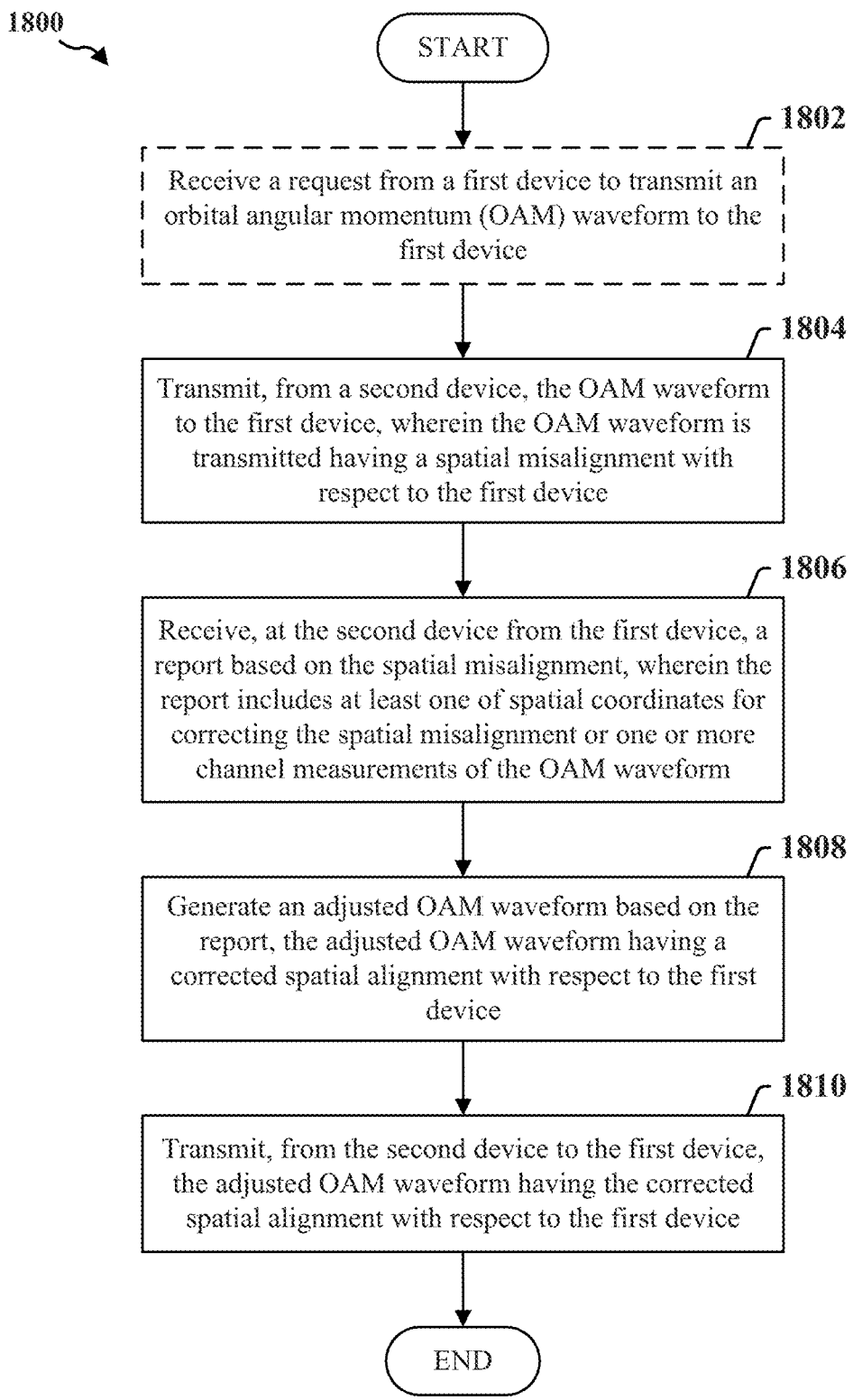
FIG. 18 is a flow chart illustrating an exemplary process for communicating an orbital angular momentum (OAM) waveform from a second device to a first device in accordance with aspects of the present disclosure.

FIG. 18 is a flow chart illustrating an exemplary process 1800 for communicating an orbital angular momentum (OAM) waveform from a second device (e.g., transmitting device) to a first device (e.g., receiving device) in accordance with aspects of the present disclosure. As described below, some or all illustrated features may be omitted in a particular implementation within the scope of the present disclosure, and some illustrated features may not be required for implementation of all aspects. In some examples, the process 1800 may be carried out by the device 1700 illustrated in FIG. 17, which may be a second device, transmitting device, base station, or gNB, as illustrated in any one or more of FIGS. 1, 3, 4A-4C, 6, and 11-13. In some examples, the process 1800 may be carried out by any suitable apparatus or means for carrying out the functions or algorithm described below.

At block 1802, the second device may receive a request from a first device to transmit an orbital angular momentum (OAM) waveform to the first device. At block 1804, the second device may transmit the OAM waveform to the first device. The OAM waveform may be transmitted having a spatial misalignment with respect to the first device.

At block 1806, the second device may receive from the first device a report based on the spatial misalignment. The report may include spatial coordinates for correcting the spatial misalignment and/or one or more channel measurements of the OAM waveform. In an aspect, the one or more channel measurements may include a received signal power of the OAM waveform and/or a phase of the OAM waveform. In an aspect, the first device may attempt to correct the spatial misalignment as best it can before sending the report to the second device. Thus, the report may include adjusted spatial coordinates for correcting the spatial misalignment reflecting the first device's best attempt at correction. Moreover, any attempt by the second device to correct the spatial misalignment may be bolstered by the first device's initial attempt.

In an aspect, the second device may receive the report via a radio resource control (RRC) message, a medium access control (MAC) control element (CE), and/or a physical layer control message. Moreover, the physical layer control message may include uplink control information (UCI).

In an aspect, the spatial misalignment may include an off-axis misalignment, a non-parallel misalignment, and/or a rotational misalignment. In a further aspect, the spatial coordinates for correcting the spatial misalignment may include: 1) spatial coordinates for correcting the off-axis misalignment relative to spatial coordinates of a beam angle of arrival of the OAM waveform; 2) spatial coordinates for correcting the non-parallel misalignment relative to the spatial coordinates of the beam angle of arrival of the OAM waveform; and/or 3) spatial coordinates for correcting the rotational misalignment relative to the spatial coordinates of the beam angle of arrival of the OAM waveform.

At block 1808, the second device may generate an adjusted OAM waveform based on the report. The adjusted OAM waveform may have a corrected spatial alignment with respect to the first device. In an aspect, the second device may generate the adjusted OAM waveform based on the spatial coordinates for correcting the spatial misalignment. Additionally or alternatively, the second device may generate the adjusted OAM waveform based on the one or more channel measurements (e.g., signal power and/or phase) of the OAM waveform. For example, the second device may determine that the OAM waveform transmitted at block 1804 is spatially misaligned based on the signal power and/or phase of the OAM waveform indicated in the report (received at block 1806). Accordingly, the second device may determine appropriate spatial coordinates for correcting the spatial misalignment based on the indicated signal power and/or phase of the OAM waveform, and generate the adjusted OAM waveform based on the appropriate spatial coordinates.

At block 1810, the second device may transmit to the first device the adjusted OAM waveform having the corrected spatial alignment with respect to the first device.

In one configuration, the device 1700 (e.g., second device or transmitting device) for wireless communication includes means for receiving a request (e.g., waveform request receiving circuitry 1740, transceiver 1710, and/or antenna array 1730) from the first device to transmit an OAM waveform to the first device, means for transmitting (e.g., waveform transmitting circuitry 1742, transceiver 1710, and/or antenna array 1730), from a second device, the OAM waveform to the first device, wherein the OAM waveform is transmitted having a spatial misalignment with respect to the first device, means for receiving (e.g., misalignment processing circuitry 1744, transceiver 1710, and/or antenna array 1730), at the second device from the first device, a report based on the spatial misalignment, wherein the report includes at least one of spatial coordinates for correcting the spatial misalignment or one or more channel measurements of the OAM waveform, means for generating (e.g., adjusted waveform generating circuitry 1746) an adjusted OAM waveform based on the report, the adjusted OAM waveform having a corrected spatial alignment with respect to the first device, and means for transmitting (e.g., waveform transmitting circuit 1742, transceiver 1710, and/or antenna array 1730), from the second device to the first device, the adjusted OAM waveform having the corrected spatial alignment. In one aspect, the aforementioned means may be the processor 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1, 3, 4A-4C, 6, and 11-13 and utilizing, for example, the processes and/or algorithms described herein in relation to FIG. 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method of wireless communication of a first device, comprising: receiving, at a first device, an orbital angular momentum (OAM) waveform from a second device, wherein the OAM waveform is received having a spatial misalignment with respect to the second device; sending, from the first device to the second device, a report based on the spatial misalignment, wherein the report includes at least one of spatial coordinates for correcting the spatial misalignment or one or more channel measurements of the OAM waveform; and receiving, at the first device, an adjusted OAM waveform from the second device, wherein the adjusted OAM waveform is received having a corrected spatial alignment with respect to the second device based on the report.

Aspect 2: The method of aspect 1, wherein the one or more channel measurements comprises at least one of: a received signal power of the OAM waveform; or a phase of the OAM waveform.

Aspect 3: The method of aspect 1 or 2, wherein the sending the report comprises sending the report via at least one of: a radio resource control (RRC) message; a medium access control (MAC) control element (CE); or a physical layer control message.

Aspect 4: The method of any one of aspects 1 through 3, wherein the physical layer control message comprises uplink control information (UCI).

Aspect 5: The method of any one of aspects 1 through 4, further comprising:
sending a request to the second device to transmit the OAM waveform to the first device.

Aspect 6: The method of any one of aspects 1 through 5, further comprising determining the spatial misalignment, wherein the spatial misalignment comprises at least one of: an off-axis misalignment; a non-parallel misalignment; or a rotational misalignment.

Aspect 7: The method of any one of aspects 1 through 6, wherein determining the off-axis misalignment or the non-parallel misalignment comprises: measuring a received signal power of the OAM waveform; determining a shape of the OAM waveform based on the received signal power; and determining the off-axis misalignment or the non-parallel misalignment based on the received signal power and the shape of the OAM waveform.

Aspect 8: The method of any one of aspects 1 through 7, wherein the determining the off-axis misalignment or the non-parallel misalignment further comprises using a Uniform Rectangular Array (URA) or Uniform Circular Array (UCA) to measure the received signal power of the OAM waveform.

Aspect 9: The method of any one aspects 7 or 8, further comprising determining spatial coordinates for correcting the off-axis misalignment or the non-parallel misalignment, comprising: measuring a beam angle of arrival of the OAM waveform from the second device; determining spatial coordinates of the beam angle of arrival; and determining the spatial coordinates for correcting the off-axis misalignment or the non-parallel misalignment relative to the spatial coordinates of the beam angle of arrival.

Aspect 10: The method of any one of aspects 1 through 6, wherein determining the rotational misalignment comprises: determining an OAM order of the OAM waveform; determining an expected beam pattern of the OAM waveform based on the OAM order; measuring a received signal power of different beams of the OAM waveform; comparing the expected beam pattern to the measured received signal power of the different beams; and determining the rotational misalignment based on the comparison.

Aspect 11: The method of aspect 10, further comprising determining spatial coordinates for correcting the rotational misalignment, comprising: measuring a beam angle of arrival of the OAM waveform from the second device; determining spatial coordinates of the beam angle of arrival; and determining the spatial coordinates for correcting the rotational misalignment relative to the spatial coordinates of the beam angle of arrival.

Aspect 12: The method of any one of aspects 1 through 6, further comprising: adjusting, at the first device, reception of the OAM waveform to correct the determined spatial misalignment.

Aspect 13: The method of aspect 12, wherein the report is sent based on the first device adjusting reception of the OAM waveform to correct the determined spatial misalignment.

Aspect 14: The method of any one of aspects 1 through 13, further comprising determining the one or more channel measurements of the OAM waveform.

Aspect 15: A first device comprising at least one processor, and a memory coupled to the at least one processor, the at least one processor and the memory configured to perform a method of any one of aspects 1 through 14.

Aspect 16: A first device comprising at least one means for performing a method of any one of aspects 1 through 14.

Aspect 17: A non-transitory computer-readable medium storing code at a first device, the code comprising instructions executable by a processor to perform a method of any one of aspects 1 through 14.

Aspect 18: A method of wireless communication of a second device, comprising: transmitting, from a second device, an orbital angular momentum (OAM) waveform to a first device, wherein the OAM waveform is transmitted having a spatial misalignment with respect to the first device; receiving, at the second device from the first device, a report based on the spatial misalignment, wherein the report includes at least one of spatial coordinates for correcting the spatial misalignment or one or more channel measurements of the OAM waveform; and transmitting, from the second device, an adjusted OAM waveform to the first device, wherein the adjusted OAM waveform is transmitted having a corrected spatial alignment with respect to the first device based on the report.

Aspect 19: The method of aspect 18, wherein the one or more channel measurements comprises at least one of: a received signal power of the OAM waveform; or a phase of the OAM waveform.

Aspect 20: The method of aspect 18 or 19, wherein the receiving the report comprises receiving the report via at least one of: a radio resource control (RRC) message; a medium access control (MAC) control element (CE); or a physical layer control message.

Aspect 21: The method of any one of aspects 18 through 20, wherein the physical layer control message comprises uplink control information (UCI).

Aspect 22: The method of any one of aspects 18 through 21, further comprising: receiving a request from the first device to transmit the OAM waveform to the first device.

Aspect 23: The method of any one of aspects 18 through 22, wherein the spatial misalignment comprises at least one of: an off-axis misalignment; a non-parallel misalignment; or a rotational misalignment.

Aspect 24: The method of any one of aspects 18 through 23, wherein the spatial coordinates for correcting the spatial misalignment comprises at least one of: spatial coordinates for correcting the off-axis misalignment relative to spatial coordinates of a beam angle of arrival of the OAM waveform; spatial coordinates for correcting the non-parallel misalignment relative to the spatial coordinates of the beam angle of arrival of the OAM waveform; or spatial coordinates for correcting the rotational misalignment relative to the spatial coordinates of the beam angle of arrival of the OAM waveform.

Aspect 25: The method of any one of aspects 18 through 24, further comprising generating the adjusted OAM waveform based on the at least one of: the spatial coordinates for correcting the spatial misalignment; or the one or more channel measurements of the OAM waveform.

Aspect 26: A second device comprising at least one processor, and a memory coupled to the at least one processor, the at least one processor and the memory configured to perform a method of any one of aspects 18 through 25.

Aspect 27: A second device comprising at least one means for performing a method of any one of aspects 18 through 25.

Aspect 28: A non-transitory computer-readable medium storing code at a second device, the code comprising instructions executable by a processor to perform a method of any one of aspects 18 through 25.

Aspect 29: A method of wireless communication of a receiving device, comprising: receiving, at a receiving device, an orbital angular momentum (OAM) waveform from a transmitting device, wherein the OAM waveform is received having a spatial misalignment with respect to the transmitting device; sending, from the receiving device to the transmitting device, a report based on the spatial misalignment, wherein the report includes at least one of spatial coordinates for correcting the spatial misalignment or one or more channel measurements of the OAM waveform; and receiving, at the receiving device, an adjusted OAM waveform from the transmitting device, wherein the adjusted OAM waveform is received having a corrected spatial alignment with respect to the transmitting device based on the report.

Aspect 30: The method of aspect 29, wherein the one or more channel measurements comprises at least one of: a received signal power of the OAM waveform; or a phase of the OAM waveform.

Aspect 31: The method of aspect 29 or 30, wherein the sending the report comprises sending the report via at least one of: a radio resource control (RRC) message; a medium access control (MAC) control element (CE); or a physical layer control message.

Aspect 32: The method of any one of aspects 29 through 31, wherein the physical layer control message comprises uplink control information (UCI).

Aspect 33: The method of any one of aspects 29 through 32, further comprising: sending a request to the transmitting device to transmit the OAM waveform to the receiving device.

Aspect 34: The method of any one of aspects 29 through 33, further comprising determining the spatial misalignment, wherein the spatial misalignment comprises at least one of: an off-axis misalignment; a non-parallel misalignment; or a rotational misalignment.

Aspect 35: The method of any one of aspects 29 through 34, wherein determining the off-axis misalignment or the non-parallel misalignment comprises: measuring a received signal power of the OAM waveform; determining a shape of the OAM waveform based on the received signal power; and determining the off-axis misalignment or the non-parallel misalignment based on the received signal power and the shape of the OAM waveform.

Aspect 36: The method of any one of aspects 29 through 35, wherein the determining the off-axis misalignment or the non-parallel misalignment further comprises using a Uniform Rectangular Array (URA) or Uniform Circular Array (UCA) to measure the received signal power of the OAM waveform.

Aspect 37: The method of any one of aspects 35 and 36, further comprising determining spatial coordinates for correcting the off-axis misalignment or the non-parallel misalignment, comprising: measuring a beam angle of arrival of the OAM waveform from the transmitting device; determining spatial coordinates of the beam angle of arrival; and determining the spatial coordinates for correcting the off-axis misalignment or the non-parallel misalignment relative to the spatial coordinates of the beam angle of arrival.

Aspect 38: The method of any one of aspects 29 through 34, wherein determining the rotational misalignment comprises: determining an OAM order of the OAM waveform; determining an expected beam pattern of the OAM waveform based on the OAM order; measuring a received signal power of different beams of the OAM waveform; comparing the expected beam pattern to the measured received signal power of the different beams; and determining the rotational misalignment based on the comparison.

Aspect 39: The method of aspect 38, further comprising determining spatial coordinates for correcting the rotational misalignment, comprising: measuring a beam angle of arrival of the OAM waveform from the second device; determining spatial coordinates of the beam angle of arrival; and determining the spatial coordinates for correcting the rotational misalignment relative to the spatial coordinates of the beam angle of arrival.

Aspect 40: The method of any one of aspects 29 through 34, further comprising adjusting, at the receiving device, reception of the OAM waveform to correct the determined spatial misalignment.

Aspect 41: The method of aspect 40, wherein the report is sent based on the receiving device adjusting reception of the OAM waveform to correct the determined spatial misalignment.

Aspect 42: The method of any one of aspects 29 through 41, further comprising determining the one or more channel measurements of the OAM waveform.

Aspect 43: A receiving device comprising at least one processor, and a memory coupled to the at least one processor, the at least one processor and the memory configured to perform a method of any one of aspects 29 through 42.

Aspect 44: A receiving device comprising at least one means for performing a method of any one of aspects 29 through 42.

Aspect 45: A non-transitory computer-readable medium storing code at a receiving device, the code comprising instructions executable by a processor to perform a method of any one of aspects 29 through 42.

Aspect 46: A method of wireless communication of a transmitting device, comprising: transmitting, from a transmitting device, an orbital angular momentum (OAM) waveform to a receiving device, wherein the OAM waveform is transmitted having a spatial misalignment with respect to the receiving device; receiving, at the transmitting device from the receiving device, a report based on the spatial misalignment, wherein the report includes at least one of spatial coordinates for correcting the spatial misalignment or one or more channel measurements of the OAM waveform; and transmitting, from the transmitting device, an adjusted OAM waveform to the receiving device, wherein the adjusted OAM waveform is transmitted having a corrected spatial alignment with respect to the receiving device based on the report.

Aspect 47: The method of aspect 46, wherein the one or more channel measurements comprises at least one of: a received signal power of the OAM waveform; or a phase of the OAM waveform.

Aspect 48: The method of aspect 46 or 47, wherein the receiving the report comprises receiving the report via at least one of: a radio resource control (RRC) message; a medium access control (MAC) control element (CE); or a physical layer control message.

Aspect 49: The method of any one of aspects 46 through 48, wherein the physical layer control message comprises uplink control information (UCI).

Aspect 50: The method of any one of aspects 46 through 49, further comprising:
receiving a request from the receiving device to transmit the OAM waveform to the receiving device.

Aspect 51: The method of any one of aspects 46 through 50, wherein the spatial misalignment comprises at least one of: an off-axis misalignment; a non-parallel misalignment; or a rotational misalignment.

Aspect 52: The method of any one of aspects 46 through 51, wherein the spatial coordinates for correcting the spatial misalignment comprises at least one of: spatial coordinates for correcting the off-axis misalignment relative to spatial coordinates of a beam angle of arrival of the OAM waveform; spatial coordinates for correcting the non-parallel misalignment relative to the spatial coordinates of the beam angle of arrival of the OAM waveform; or spatial coordinates for correcting the rotational misalignment relative to the spatial coordinates of the beam angle of arrival of the OAM waveform.

Aspect 53: The method of any one of aspects 46 through 52, further comprising generating the adjusted OAM waveform based on the least one of: the spatial coordinates for correcting the spatial misalignment; or the one or more channel measurements of the OAM waveform.

Aspect 54: A transmitting device comprising at least one processor, and a memory coupled to the at least one processor, the at least one processor and the memory configured to perform a method of any one of aspects 46 through 53.

Aspect 55: A transmitting device comprising at least one means for performing a method of any one of aspects 46 through 53.

Aspect 56: A non-transitory computer-readable medium storing code at a transmitting device, the code comprising instructions executable by a processor to perform a method of any one of aspects 46 through 53.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a first device, comprising:
   receiving, at the first device, an orbital angular momentum (OAM) waveform from a second device, wherein the OAM waveform is spatially misaligned with respect to the second device, and wherein a spatial misalignment of the OAM waveform comprises at least one of a non-parallel misalignment or a rotational misalignment;
   sending, from the first device for the second device, a report based on the spatial misalignment, wherein the report includes at least one of spatial coordinates to correct the spatial misalignment or one or more channel measurements of the OAM waveform; and
   receiving, at the first device, an adjusted OAM waveform from the second device, wherein the adjusted OAM waveform is spatially aligned with respect to the second device based on the report.

2. The method of claim 1, wherein the one or more channel measurements comprises at least one of:
   a received signal power of the OAM waveform; or
   a phase of the OAM waveform.

3. The method of claim 1, wherein the sending the report comprises sending the report via at least one of:
   a radio resource control (RRC) message;
   a medium access control (MAC) control element (CE); or
   a physical layer control message.

4. The method of claim 3, wherein the physical layer control message comprises uplink control information (UCI).

5. The method of claim 1, further comprising:
   sending a request for the second device to transmit the OAM waveform to the first device.

6. The method of claim 1, further comprising determining the spatial misalignment, wherein the spatial misalignment further comprises:
   an off-axis misalignment.

7. The method of claim 6, wherein determining the off-axis misalignment or the non-parallel misalignment comprises:
   measuring a received signal power of the OAM waveform;
   determining a shape of the OAM waveform based on the received signal power; and
   determining the off-axis misalignment or the non-parallel misalignment based on the received signal power and the shape of the OAM waveform.

8. The method of claim 7, wherein the determining the off-axis misalignment or the non-parallel misalignment further comprises using a Uniform Rectangular Array (URA) or Uniform Circular Array (UCA) to measure the received signal power of the OAM waveform.

9. The method of claim 7, further comprising determining spatial coordinates to correct the off-axis misalignment or the non-parallel misalignment, comprising:
   measuring a beam angle of arrival of the OAM waveform from the second device;
   determining spatial coordinates of the beam angle of arrival; and
   determining the spatial coordinates for correcting to correct the off-axis misalignment or the non-parallel misalignment relative to the spatial coordinates of the beam angle of arrival.

10. The method of claim 6, wherein the spatial misalignment comprises the rotational misalignment and determining the rotational misalignment comprises:
    determining an OAM order of the OAM waveform;
    determining an expected beam pattern of the OAM waveform based on the OAM order;
    measuring at least one received signal power of different beams of the OAM waveform;
    comparing the expected beam pattern to the measured at least one received signal power of the different beams; and
    determining the rotational misalignment based on the comparison.

11. The method of claim 10, further comprising determining spatial coordinates to correct the rotational misalignment, comprising:
    measuring a beam angle of arrival of the OAM waveform from the second device;
    determining spatial coordinates of the beam angle of arrival; and
    determining the spatial coordinates to correct the rotational misalignment relative to the spatial coordinates of the beam angle of arrival.

12. The method of claim 6, further comprising:
    adjusting, at the first device, reception of the OAM waveform to correct the determined spatial misalignment.

13. The method of claim 12, wherein the report is sent based on the first device adjusting reception of the OAM waveform to correct the determined spatial misalignment.

14. The method of claim 1, further comprising determining the one or more channel measurements of the OAM waveform.

15. An apparatus for wireless communication at a first device, comprising:
    one or more processors; and
    a memory coupled to the one or more processors, the one or more processors configured to cause the first device to:
       receive, at the first device, an orbital angular momentum (OAM) waveform from a second device, wherein the OAM waveform is spatially misaligned with respect to the second device, and wherein a spatial misalignment of the OAM waveform comprises at least one of a non-parallel misalignment or a rotational misalignment,
       send, from the first device for the second device, a report based on the spatial misalignment, wherein the report includes at least one of spatial coordinates to correct the spatial misalignment or one or more channel measurements of the OAM waveform, and
       receive, at the first device, an adjusted OAM waveform from the second device, wherein the adjusted OAM waveform is spatially aligned with respect to the second device based on the report.

16. The apparatus of claim 15, wherein the one or more channel measurements comprises at least one of:
    a received signal power of the OAM waveform; or
    a phase of the OAM waveform.

17. The apparatus of claim 15, wherein the one or more processors are configured to cause the first device to send the report via at least one of:
    a radio resource control (RRC) message;
    a medium access control (MAC) control element (CE); or
    a physical layer control message.

18. The apparatus of claim 17, wherein the physical layer control message comprises uplink control information (UCI).

19. The apparatus of claim 15, wherein the one or more processors are further configured to cause the first device to:

send a request for the second device to transmit the OAM waveform to the first device.

20. The apparatus of claim 15, wherein the one or more processors are further configured to cause the first device to determine the spatial misalignment, the spatial misalignment further comprising:
an off-axis misalignment.

21. The apparatus of claim 20, wherein the one or more processors configured to cause the first device to determine the off-axis misalignment or the non-parallel misalignment are further configured to cause the first device to:
measure a received signal power of the OAM waveform;
determine a shape of the OAM waveform based on the received signal power; and
determine the off-axis misalignment or the non-parallel misalignment based on the received signal power and the shape of the OAM waveform.

22. The apparatus of claim 21, wherein the one or more processors configured to cause the first device to determine the off-axis misalignment or the non-parallel misalignment are further configured to cause the first device to use a Uniform Rectangular Array (URA) or Uniform Circular Array (UCA) to measure the received signal power of the OAM waveform.

23. The apparatus of claim 21, wherein the one or more processors are further configured to cause the first device to determine spatial coordinates to correct the off-axis misalignment or the non-parallel misalignment, wherein the one or more processors are further configured to cause the first device to:
measure a beam angle of arrival of the OAM waveform from the second device;
determine spatial coordinates of the beam angle of arrival; and
determine the spatial coordinates to correct the off-axis misalignment or the non-parallel misalignment relative to the spatial coordinates of the beam angle of arrival.

24. The apparatus of claim 20, wherein the spatial misalignment comprises the rotational misalignment and the one or more processors configured to cause the first device to determine the rotational misalignment are further configured to cause the first device to:
determine an OAM order of the OAM waveform;
determine an expected beam pattern of the OAM waveform based on the OAM order;
measure at least one received signal power of different beams of the OAM waveform;
compare the expected beam pattern to the measured at least one received signal power of the different beams; and
determine the rotational misalignment based on the comparison.

25. The apparatus of claim 24, wherein the one or more processors are further configured to cause the first device to determine spatial coordinates to correct the rotational misalignment, wherein the one or more processors are further configured to cause the first device to:
measure a beam angle of arrival of the OAM waveform from the second device;
determine spatial coordinates of the beam angle of arrival; and
determine the spatial coordinates to correct the rotational misalignment relative to the spatial coordinates of the beam angle of arrival.

26. The apparatus of claim 15, wherein the one or more processors are further configured to cause the first device to determine the one or more channel measurements of the OAM waveform.

27. An apparatus for wireless communication at a first device, comprising:
means for receiving, at the first device, an orbital angular momentum (OAM) waveform from a second device, wherein the OAM waveform is spatially misaligned with respect to the second device, and wherein a spatial misalignment of the OAM waveform comprises at least one of a non-parallel misalignment or a rotational misalignment;
means for sending, from the first device for the second device, a report based on the spatial misalignment, wherein the report includes at least one of spatial coordinates to correct the spatial misalignment or one or more channel measurements of the OAM waveform; and
means for receiving, at the first device, an adjusted OAM waveform from the second device, wherein the adjusted OAM waveform is spatially aligned with respect to the second device based on the report.

28. A non-transitory computer-readable medium storing code at a first device for wireless communication, the code comprising instructions executable by one or more processors to cause the first device to:
receive, at the first device, an orbital angular momentum (OAM) waveform from a second device, wherein the OAM waveform is spatially misaligned with respect to the second device, and wherein a spatial misalignment of the OAM waveform comprises at least one of a non-parallel misalignment or a rotational misalignment;
send, from the first device for the second device, a report based on the spatial misalignment, wherein the report includes at least one of spatial coordinates to correct the spatial misalignment or one or more channel measurements of the OAM waveform; and
receive, at the first device, an adjusted OAM waveform from the second device, wherein the adjusted OAM waveform is spatially aligned with respect to the second device based on the report.

29. A method of wireless communication at a second device, comprising:
transmitting, from the second device, an orbital angular momentum (OAM) waveform to a first device, wherein the OAM waveform is spatially misaligned with respect to the first device, and wherein a spatial misalignment of the OAM waveform comprises at least one of a non-parallel misalignment or a rotational misalignment;
receiving, at the second device, a report based on the spatial misalignment, wherein the report includes at least one of spatial coordinates to correct the spatial misalignment or one or more channel measurements of the OAM waveform; and
transmitting, from the second device, an adjusted OAM waveform to the first device, wherein the adjusted OAM waveform is spatially aligned with respect to the first device based on the report.

30. The method of claim 29, wherein the one or more channel measurements comprises at least one of:
a received signal power of the OAM waveform; or
a phase of the OAM waveform.

31. The method of claim 29, wherein the receiving the report comprises receiving the report via at least one of:

a radio resource control (RRC) message;
a medium access control (MAC) control element (CE); or
a physical layer control message.

32. The method of claim 31, wherein the physical layer control message comprises uplink control information (UCI).

33. The method of claim 29, further comprising:
receiving a request to transmit the OAM waveform to the first device.

34. The method of claim 29, wherein the spatial misalignment further comprises:
an off-axis misalignment.

35. The method of claim 34, wherein the spatial coordinates to correct the spatial misalignment comprises at least one of:
spatial coordinates to correct the off-axis misalignment relative to spatial coordinates of a beam angle of arrival of the OAM waveform;
spatial coordinates to correct the non-parallel misalignment relative to the spatial coordinates of the beam angle of arrival of the OAM waveform; or
spatial coordinates to correct the rotational misalignment relative to the spatial coordinates of the beam angle of arrival of the OAM waveform.

36. The method of claim 29, further comprising generating the adjusted OAM waveform based on the at least one of:
the spatial coordinates to correct the spatial misalignment; or
the one or more channel measurements of the OAM waveform.

37. An apparatus for wireless communication at a second device, comprising:
one or more processors; and
a memory coupled to the one or more processors, the one or more processors configured to cause the second device to:
transmit, from the second device, an orbital angular momentum (OAM) waveform to a first device, wherein the OAM waveform is spatially misaligned with respect to the first device, and wherein a spatial misalignment of the OAM waveform comprises at least one of a non-parallel misalignment or a rotational misalignment,
receive, at the second device, a report based on the spatial misalignment, wherein the report includes at least one of spatial coordinates to correct the spatial misalignment or one or more channel measurements of the OAM waveform, and
transmit, from the second device, an adjusted OAM waveform to the first device, wherein the adjusted OAM waveform is spatially aligned with respect to the first device based on the report.

38. The apparatus of claim 37, wherein the one or more channel measurements comprises at least one of:
a received signal power of the OAM waveform; or
a phase of the OAM waveform.

39. The apparatus of claim 37, wherein the one or more processors are configured to cause the second device to receive the report via at least one of:
a radio resource control (RRC) message;
a medium access control (MAC) control element (CE); or
a physical layer control message.

40. The apparatus of claim 39, wherein the physical layer control message comprises uplink control information (UCI).

41. The apparatus of claim 37, wherein the one or more processors are further configured to cause the second device to:
receive a request to transmit the OAM waveform to the first device.

42. The apparatus of claim 37, wherein the spatial misalignment further comprises:
an off-axis misalignment.

43. The apparatus of claim 42, wherein the spatial coordinates to correct the spatial misalignment comprises at least one of:
spatial coordinates to correct the off-axis misalignment relative to spatial coordinates of a beam angle of arrival of the OAM waveform;
spatial coordinates to correct the non-parallel misalignment relative to the spatial coordinates of the beam angle of arrival of the OAM waveform; or
spatial coordinates to correct the rotational misalignment relative to the spatial coordinates of the beam angle of arrival of the OAM waveform.

44. The apparatus of claim 37, wherein the one or more processors are further configured to cause the second device to generate the adjusted OAM waveform based on the at least one of:
the spatial coordinates to correct the spatial misalignment; or
the one or more channel measurements of the OAM waveform.

45. An apparatus for wireless communication at a second device, comprising:
means for transmitting, from the second device, an orbital angular momentum (OAM) waveform to a first device, wherein the OAM waveform is spatially misaligned with respect to the first device, and wherein a spatial misalignment of the OAM waveform comprises at least one of a non-parallel misalignment or a rotational misalignment;
means for receiving, at the second device, a report based on the spatial misalignment, wherein the report includes at least one of spatial coordinates to correct the spatial misalignment or one or more channel measurements of the OAM waveform; and
means for transmitting, from the second device, an adjusted OAM waveform to the first device, wherein the adjusted OAM waveform is spatially aligned with respect to the first device based on the report.

46. A non-transitory computer-readable medium storing code at a second device for wireless communication, the code comprising instructions executable by one or more processors to cause the second device to:
transmit, from the second device, an orbital angular momentum (OAM) waveform to a first device, wherein the OAM waveform is spatially misaligned with respect to the first device, and wherein a spatial misalignment of the OAM waveform comprises at least one of a non-parallel misalignment or a rotational misalignment,
receive, at the second device, a report based on the spatial misalignment, wherein the report includes at least one of spatial coordinates to correct the spatial misalignment or one or more channel measurements of the OAM waveform, and
transmit, from the second device, an adjusted OAM waveform to the first device, wherein the adjusted OAM waveform is spatially aligned with respect to the first device based on the report.

\* \* \* \* \*